(12) United States Patent
Fujimoto et al.

(10) Patent No.: US 11,548,382 B2
(45) Date of Patent: Jan. 10, 2023

(54) VEHICLE

(71) Applicant: YAMAHA HATSUDOKI KABUSHIKI KAISHA, Iwata (JP)

(72) Inventors: Hiroyuki Fujimoto, Shizuoka (JP); Masanao Miyazaki, Shizuoka (JP); Shigeaki Oba, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 485 days.

(21) Appl. No.: 16/795,620

(22) Filed: Feb. 20, 2020

(65) Prior Publication Data
US 2020/0269685 A1    Aug. 27, 2020

(30) Foreign Application Priority Data
Feb. 21, 2019    (JP) .............................. JP2019-029732

(51) Int. Cl.
| | | |
|---|---|---|
| B60K 17/35 | (2006.01) | |
| B60K 17/02 | (2006.01) | |
| B60N 2/01 | (2006.01) | |
| B60K 17/34 | (2006.01) | |
| B60T 1/06 | (2006.01) | |

(52) U.S. Cl.
CPC .............. *B60K 17/02* (2013.01); *B60K 17/34* (2013.01); *B60K 17/35* (2013.01); *B60N 2/012* (2013.01); *B60T 1/062* (2013.01); *B60G 2300/024* (2013.01)

(58) Field of Classification Search
CPC ........ B60K 17/02; B60K 17/34; B60K 17/35; B60N 2/012; B60T 1/062; B60G 2300/024; B60Y 2400/424; F16D 55/40
See application file for complete search history.

(56) References Cited

U.S. PATENT DOCUMENTS

| | | | |
|---|---|---|---|
| 7,950,486 B2 | 5/2011 | Van Bronkhorst et al. | |
| 2007/0181358 A1* | 8/2007 | Nakagaki | B60K 17/22 180/233 |
| 2009/0183939 A1* | 7/2009 | Smith | B60N 2/3011 180/311 |
| 2010/0304930 A1* | 12/2010 | Poulin | B60W 10/18 477/184 |
| 2011/0108351 A1* | 5/2011 | Gervais | F16H 57/038 180/337 |

\* cited by examiner

*Primary Examiner* — Justin Holmes
(74) *Attorney, Agent, or Firm* — Keating and Bennett, LLP

(57) ABSTRACT

A vehicle includes an engine, a front frame, a rear frame, an intermediate frame, a front propeller shaft, a rear propeller shaft, and a wet oiling brake. A pair of right and left front lower arms are swingably mounted to the front frame. A pair of right and left rear lower arms are swingably mounted to the rear frame. The intermediate frame is located between the front frame and the rear frame. The front propeller shaft extends forward from the engine and the rear propeller shaft extends rearward from the engine. The wet oiling brake is located within a region defined by the intermediate frame in the front-rear direction and brakes a rotation of the front propeller shaft.

20 Claims, 15 Drawing Sheets

VEHICLE

CROSS REFERENCE TO RELATED APPLICATIONS

This application claims the benefit of priority to Japanese Patent Application No. 2019-029732 filed on Feb. 21, 2019. The entire contents of this application are hereby incorporated herein by reference.

BACKGROUND OF THE INVENTION

1. Field of the Invention

The present invention relates to a vehicle that includes an arm that is swingably mounted to a frame of a vehicle body and supports a vehicle wheel.

2. Description of the Related Art

A vehicle described in U.S. Pat. No. 7,950,486 includes a frame, an engine, a front drive line, a front differential, a rear drive line, a rear differential, a front suspension, a rear suspension, and a parking brake. The engine is supported by a central portion of the frame.

The front drive line includes a shaft extending forward from the engine. The front differential is mounted to a front portion of the frame and is linked to the shaft of the front drive line. The rear drive line includes a shaft extending rearward from the engine. The rear differential is mounted to a rear portion of the frame and is linked to the shaft of the rear drive line. A rotational power of the engine is transmitted to right and left front wheels via the front drive line and the front differential. The rotational power of the engine is transmitted to right and left rear wheels via the rear drive line and the rear differential.

The front suspension includes a pair of right and left control arms respectively supporting the right and left front wheels. These control arms are swingably mounted to a front portion of the frame. The rear suspension includes a pair of right and left control arms respectively supporting the right and left rear wheels. These control arms are swingably mounted to a rear portion of the frame. The parking brake is located in the front drive line or the rear drive line.

With the vehicle described in U.S. Pat. No. 7,950,486, it is preferable for right-left lengths of the respective control arms of the front suspension and the rear suspension to be long to secure excellent motion performance when travelling on a rough road such as rough terrain, etc. Lengths from the centers of the swing points of the control arms to the vehicle wheels are thereby long and the vehicle wheels thus undergo up-down movement along an arc of a larger radius. Consequently, changes in right-left direction positions and orientations of the vehicle wheels when the vehicle wheels undergo up-down movement become small, thus securing excellent motion performance. On the other hand, a vehicle width of this type of vehicle is preferably as small as possible to enable passage through locations of narrow width. When the vehicle width is small, it is difficult to make the right-left lengths of the control arms long and when the right-left lengths of the control arms are long, it is difficult to make the vehicle width small. That is, making the vehicle compact and securing long lengths of the control arms conflict with each other.

SUMMARY OF THE INVENTION

In order to overcome the previously unrecognized and unsolved challenges described above, preferred embodiments of the present invention provide vehicles each including at least one seat, an engine, a front frame, a rear frame, an intermediate frame, a front propeller shaft, a rear propeller shaft, and a wet oiling brake. The seats are located such that a plurality of occupants are able to be seated in a right-left direction. A pair of right and left front arms respectively supporting right and left front wheels are swingably mounted to the front frame. A pair of right and left rear arms respectively supporting right and left rear wheels are swingably mounted to the rear frame. The intermediate frame is located between the front frame and the rear frame in a front-rear direction and supports the at least one seat and the engine. The front propeller shaft extends forward from the engine and transmits a rotational power of the engine to the front wheels. The rear propeller shaft extends rearward from the engine and transmits the rotational power of the engine to the rear wheels. The wet oiling brake is located in a region defined by the intermediate frame in the front-rear direction. The wet oiling brake includes a first multiple disk clutch including a first clutch plate and a second clutch plate, and a first inner space accommodating the first multiple disk clutch and lubricating oil. The first clutch plate is rotated with the front propeller shaft or the rear propeller shaft. The second clutch plate is fixed with respect to a position in a rotating direction of the first clutch plate. The wet oiling brake brakes rotation of the front propeller shaft or the rear propeller shaft through contact between the first clutch plate and the second clutch plate.

In accordance with a preferred embodiment of the present invention, the wet oiling brake includes the first multiple disk clutch that brakes the rotation of a propeller shaft through contact between the first clutch plate and the second clutch plate is located in the region defined by the intermediate frame in the front-rear direction. An installation space for the wet oiling brake is thus not required to be provided in the front frame or the rear frame. This enables widths of the front frame and the rear frame to be narrow. Making the vehicle compact at the front frame and the rear frame is thus enabled, and the front arms which are mounted to the front frame and support the front wheels, and the rear arms which are mounted to the rear frame and support the rear wheels are thus able to be long. That is, securing sufficient lengths of the front arms and the rear arms is enabled while making the vehicle compact.

In a preferred embodiment of the present invention, the vehicle further includes a front drive shaft, a rear drive shaft, a front gearing, and a rear gearing. The front drive shaft extends rightward and leftward and is linked to the front wheels. The rear drive shaft extends rightward and leftward and is linked to the rear wheels. The front gearing is supported by the front frame and links the front propeller shaft and the front drive shaft. The rear gearing is supported by the rear frame and links the rear propeller shaft and the rear drive shaft. In this case, the wet oiling brake is preferably located between the front gearing and the rear gearing.

In accordance with a preferred embodiment of the present invention, the wet oiling brake is located between the front gearing supported by the front frame and the rear gearing supported by the rear frame. The installation space for the wet oiling brake that brakes the rotation of the propeller shaft is thus not required to be provided in the front frame or the rear frame. This enables the widths of the front frame and the rear frame to be narrow. The front arms and the rear arms are thus able to be long while making the vehicle compact at the front frame and the rear frame.

In a preferred embodiment of the present invention, the wet oiling brake is located between rear ends of the front arms and front ends of the rear arms. In accordance with this preferred embodiment, the wet oiling brake is located between the rear ends of the front arms which are mounted to the front frame, and the front ends of the rear arms which are mounted to the rear frame. The installation space for the wet oiling brake that brakes the rotation of the propeller shaft is thus not required to be provided in the front frame or the rear frame. This enables the widths of the front frame and the rear frame to be narrow. The front arms and the rear arms are thus able to be long while making the vehicle compact at the front frame and the rear frame.

In a preferred embodiment of the present invention, the wet oiling brake is located farther forward or farther rearward than the engine. In accordance with this preferred embodiment, the wet oiling brake is located in proximity to the engine that is supported by the intermediate frame. The installation space for the wet oiling brake that brakes the rotation of the propeller shaft is thus not required to be provided in the front frame or the rear frame. This enables the widths of the front frame and the rear frame to be narrow. The front arms and the rear arms are thus able to be long while making the vehicle compact at the front frame and the rear frame.

In a preferred embodiment of the present invention, the intermediate frame is wider than the front frame and the rear frame. This arrangement enables the installation space for the wet oiling brake that brakes the rotation of the propeller shaft to be secured in the wide intermediate frame. The installation space is thus not required to be provided in the front frame or the rear frame. This enables the widths of the front frame and the rear frame to be narrow. The front arms and the rear arms are thus able to be long while making the vehicle compact at the front frame and the rear frame.

In a preferred embodiment of the present invention, the vehicle further includes a shiftable transmission that shifts and transmits the rotational power from the engine to the front propeller shaft and the rear propeller shaft. In this case, the wet oiling brake is preferably located downstream of the shiftable transmission in a transmission direction of rotational power from the engine to the front wheels or the rear wheels. In accordance with this preferred embodiment, the wet oiling brake that brakes the rotation of the propeller shaft can be located farther forward or rearward than the shiftable transmission that transmits the rotational power from the engine supported by the intermediate frame toward the front wheels or the rear wheels. The installation space for the wet oiling brake is thus not required to be provided in the rear frame when the wet oiling brake is located farther forward than the shiftable transmission. This enables the width of the rear frame to be narrow. The rear arms are thus able to be long while making the vehicle compact at the rear frame. On the other hand, when the wet oiling brake is located farther rearward than the shiftable transmission, the installation space for the wet oiling brake is not required to be provided in the front frame. This enables the width of the front frame to be narrow. The front arms are thus able to be long while making the vehicle compact at the front frame.

In a preferred embodiment of the present invention, the shiftable transmission is located farther forward than the engine, and the wet oiling brake is located farther forward than the shiftable transmission. In accordance with this preferred embodiment, the wet oiling brake that brakes the rotation of the propeller shaft is located farther forward than the shiftable transmission which is farther forward than the engine, which is supported by the intermediate frame. The installation space for the wet oiling brake that brakes the rotation of the propeller shaft is thus not required to be provided in the rear frame. This enables the width of the rear frame to be narrow. The rear arms are thus able to be long while making the vehicle compact at the rear frame.

According to a preferred embodiment of the present invention, the shiftable transmission includes a second inner space containing lubricating oil, and the first inner space is communicated with the second inner space in such a manner that the lubricating oil in the second inner space can flow into the first inner space. In accordance with this preferred embodiment, the lubricating oil in the second inner space of the shiftable transmission can flow into the first inner space of the wet oiling brake to lubricate and cool the first multiple disk clutch in the first inner space by this lubricating oil. The arms swingably attached to the frame to support the wheels can thus remain long while making the vehicle compact and using the lubricating oil efficiently.

According to a preferred embodiment of the present invention, the vehicle further includes a torque limiter downstream of the wet oiling brake in the transmission direction of the rotational power from the engine to the front wheels or the rear wheels. The torque limiter interrupts transmission of a rotational power equal to or more than a predetermined amount between the wet oiling brake and the front wheels or the rear wheels. In accordance with this preferred embodiment, since a rotational power equal to or more than a predetermined amount is not transmitted between the wet oiling brake and the front wheels or the rear wheels by the torque limiter, an overload due to this rotational power being applied to a transmission transmitting a rotational power between the wet oiling brake and the front wheels or the rear wheels is able to be prevented.

According to a preferred embodiment of the present invention, the front propeller shaft or the rear propeller shaft is separated into a first portion rotated with the first clutch plate and a second portion being relatively rotatable to the first portion. The torque limiter includes a second multiple disk clutch and a third inner space accommodating the second multiple disk clutch and lubricating oil. The second multiple disk clutch includes a third clutch plate rotated with the first portion and a fourth clutch plate that can contact and separate from the third clutch plate and is rotated with the second portion. The third inner space is communicated with the first inner space in such a manner that the lubricating oil in the first inner space can flow into the third inner space.

In accordance with this preferred embodiment, at the front propeller shaft or the rear propeller shaft, a rotation of the first portion is braked by contact of the first clutch plate and the second clutch plate in the wet oiling brake. At the front propeller shaft or the rear propeller shaft, the first portion and the second portion are linked by contact of the third clutch plate and the fourth clutch plate in the second multiple disk clutch of the torque limiter. Thus, transmission of a rotational power between the wet oiling brake and the front wheels or the rear wheels is made possible. On the other hand, at the torque limiter, transmission of a rotational power equal to or more than a predetermined amount between the wet oiling brake and the front wheels or the rear wheels can be interrupted by separation of the third clutch plate and the fourth clutch plate.

Further, the lubricating oil in the first inner space of the wet oiling brake can flow into the third inner space of the torque limiter to lubricate and cool the second multiple disk clutch in the third inner space by this lubricating oil. The arms swingably attached to the frame to support the wheels can thus remain long while making the vehicle compact and using the lubricating oil efficiently.

According to a preferred embodiment of the present invention, the lubricating oil is shared in the first inner space, the second inner space, and the third inner space. In accordance with this preferred embodiment, the first multiple disk clutch in the first inner space of the wet oiling brake, and structures in the second inner space of the shiftable transmission, and the second multiple disk clutch in the third inner space of the torque limiter can be lubricated and cooled by the shared lubricating oil. The arms swingably attached to the frame to support the wheels can thus remain long while making the vehicle compact and using the lubricating oil efficiently.

In a preferred embodiment of the present invention, the seat includes a pair of seats that are aligned in the right-left direction. In this case, it is preferable for at least a portion of the wet oiling brake to be located in a region between the pair of seats in a plan view of the vehicle.

In a preferred embodiment of the present invention, the vehicle further includes a brake lever, an operating lever, and a wire linking the brake lever and the operating lever. The brake lever pivots to contact and separate the first clutch plate and the second clutch plate. The operating lever is pivoted by an occupant sitting on the seat to operate or release the wet oiling brake. A pivot axis of the brake lever and a pivot axis of the operating lever are oriented in the same or generally the same direction. The operating lever is located in a region between the pair of seats in a plan view.

In accordance with this preferred embodiment, when an occupant seated on either of the pair of seats pivots the operating lever between these seats, an operational power thereof is transmitted to the brake lever via the wire to make the brake lever pivot. Since the first clutch plate and the second clutch plate are contacted or separated in response to the pivot of the brake lever, the wet oiling brake is operated or released.

When a pivot axis of the brake lever and a pivot axis of the operating lever are oriented so as to be orthogonalized to each other in plan view, for example, the wire is required to be greatly detoured in order to link the brake lever and the operating lever. This makes the wire long. However, according to a preferred embodiment of the present invention, the pivot axis of the brake lever and the pivot axis of the operating lever are oriented in the same or generally the same direction in plan view. Accordingly, since the wire can link the brake lever and the operating lever without being greatly detoured, the wire can be shortened. The arms swingably attached to the frame to support the wheels can thus remain long while making the vehicle compact and shortening the wire.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the preferred embodiments of the present invention described below, front-rear, right-left, and up-down are directions defined based on a viewpoint of a driver sitting on a seat of a vehicle and facing a steering wheel. The right-left direction is a vehicle width direction of the vehicle. Also, the description shall be provided based on a state where the vehicle is on a horizontal plane.

Figure 1:
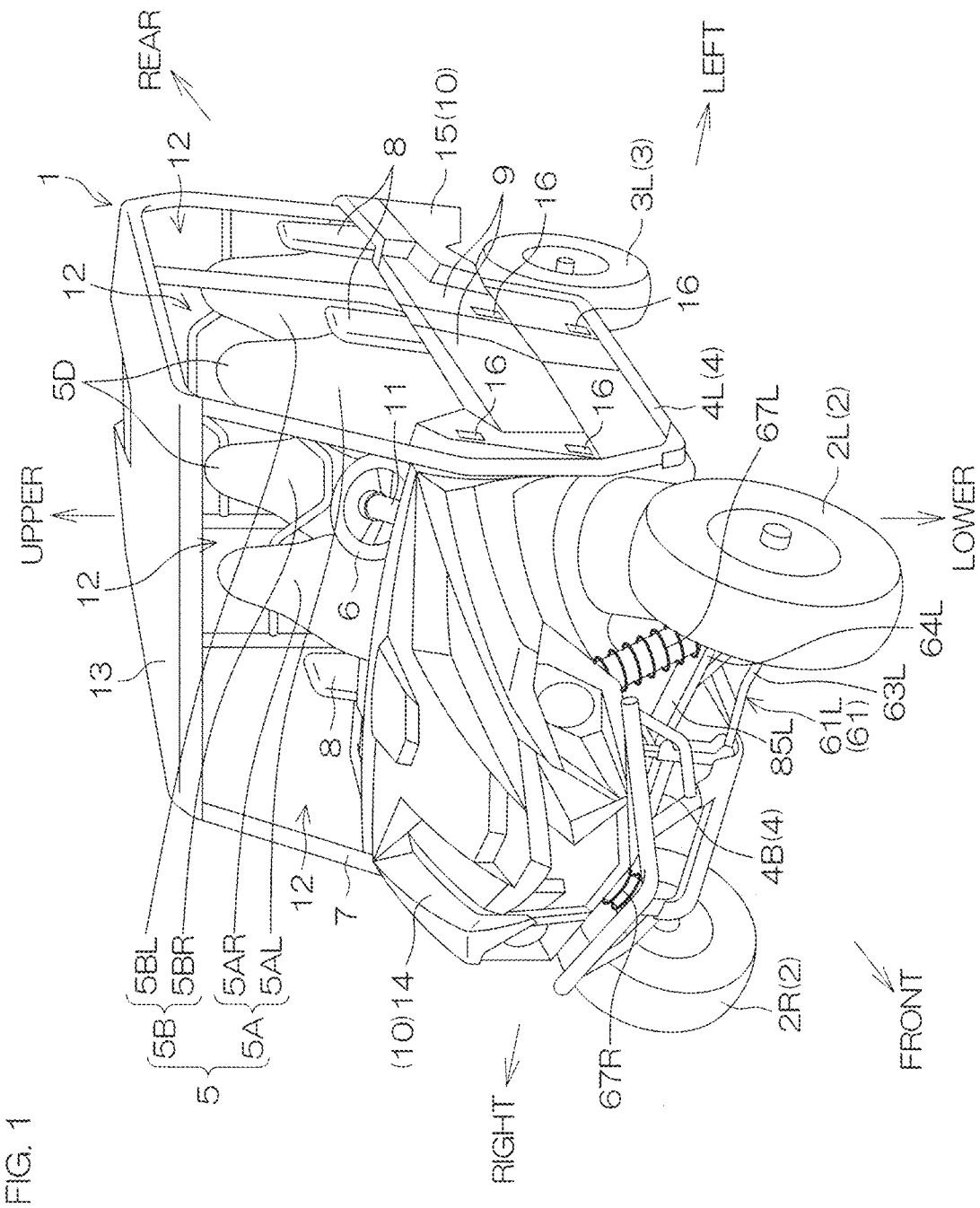
FIG. 1 is a schematic perspective view of a vehicle according to a preferred embodiment of the present invention.

FIG. 1 is a schematic perspective view of the vehicle 1 according to a preferred embodiment of the present invention. The vehicle 1 is preferably a utility vehicle and more specifically is preferably a four-wheel drive, all-terrain vehicle that is called a recreational off-road vehicle and travels through forests, deserts, etc.

The vehicle 1 includes a pair of right and left front wheels 2, a pair of right and left rear wheels 3, a frame 4, at least one seat 5, a steering wheel 6, a roll cage 7, bolsters 8, doors 9, and a body panel 10.

The pair of right and left front wheels 2 include a right front wheel 2R and a left front wheel 2L that are aligned in the right-left direction. The pair of right and left rear wheels 3 include a right rear wheel 3R and a left rear wheel 3L that are aligned in the right-left direction and located farther rearward than the front wheels 2. Each of the left front wheel 2L, right front wheel 2R, left rear wheel 3L, and right rear wheel 3R includes a tire. Recesses and projections in a block pattern to travel on rough terrain may be provided on a surface of each tire. A wheelbase of the vehicle 1 is preferably short and the vehicle width is narrow in order to travel with good maneuverability even in narrow locations such as between trees, etc.

The frame 4 defines a vehicle body of the vehicle 1. The frame 4 is supported by the pair of right and left front wheels 2 and the pair of right and left rear wheels 3. The frame 4 is preferably made of a metal, such as iron or aluminum, etc., and includes an intermediate frame 4A, a left frame 4L, a right frame 4R, a front frame 4B, a rear frame 4C, and an upper frame 4D (see FIG. 2 described below). The left frame 4L is provided at the left of the intermediate frame 4A. The right frame 4R is provided at the right of the intermediate frame 4A. The front frame 4B is provided in front of the intermediate frame 4A. The rear frame 4C is provided at the rear of the intermediate frame 4A. The upper frame 4D is provided above the rear frame 4C.

The vehicle 1 of the present preferred embodiment preferably seats four people, for example. Accordingly, the seats 5 include a pair of right and left front seats 5A and a pair of right and left rear seats 5B. The front seats 5A and the rear seats 5B are respectively located such that a plurality of occupants are seated alongside each other in the right-left direction. The pair of right and left front seats 5A include a right front seat 5AR and a left front seat 5AL that are aligned in the right-left direction. The pair of right and left rear seats 5B include a right rear seat 5BR and a left rear seat 5BL that are aligned in the right-left direction and located farther rearward than the front seats 5A. One of the front seats 5A, for example, the left front seat 5AL is a driver's seat on which the driver sits while facing forward. Each of the seats 5 includes a seat portion 5C and a backrest 5D rising from a rear end of the seat portion 5C, and an upper surface of the seat portion 5C is a seat surface 5E of the seat 5 (see FIG. 3 described below). The seat surface 5E may be a horizontal or substantially horizontal flat surface or may be a downwardly recessed, concave, curved surface. The seat surfaces 5E of the left front seat 5AL and the right front seat 5AR are mutually at the same or substantially the same height position. The seat surfaces 5E of the left rear seat 5BL and the right rear seat 5BR are mutually at the same or substantially the same height position. The seat surfaces 5E of the front seats 5A and the seat surfaces 5E of the rear seats 5B may be at the same or substantially the same height position.

The steering wheel 6 is located in front of the left front seat 5AL. A steering shaft 11 is mounted so as to be rotatable around its axis to the frame 4. The steering wheel 6 is coupled to a rear end of the steering shaft 11.

The roll cage 7 is mounted to the frame 4 and surrounds the pair of front seats 5A and the rear seats 5B. The roll cage 7 defines openings 12, one each at the left of the left front seat 5AL, the right of the right front seat 5AR, the left of the left rear seat 5BL, and the right of the right rear seat 5BR, for boarding and exiting of the occupants. A roof 13 is coupled to an upper portion of the roll cage 7.

The bolsters 8 are plates made of, for example, resin and one each is provided adjacent to the left of the left front seat 5AL, adjacent to the right of the right front seat 5AR, adjacent to the left of the left rear seat 5BL, and adjacent to the right of the right rear seat 5BR. Each bolster 8 faces the occupant seated on the corresponding seat 5 from the outer side in the right-left direction and helps contain the occupant.

The doors 9 are provided one each at each opening 12, are mounted to the frame 4 via hinges 16, and are able to open and close by swinging around vertical axes. Each of the doors 9 in FIG. 1 is at a closed position and closes a lower region of an opening 12. When an occupant swings a door 9 outward, the door 9 is located at an open position and opens the lower region of an opening 12.

The body panel 10 is made, for example, of resin and is mounted to the frame 4. The body panel 10 includes a front panel 14 covering a front portion of the vehicle 1 farther forward than the front seats 5A, and a rear panel 15 covering a rear portion of the vehicle 1 farther rearward than the rear seats 5B. The doors 9 may define a portion of the body panel 10.

Figure 2:
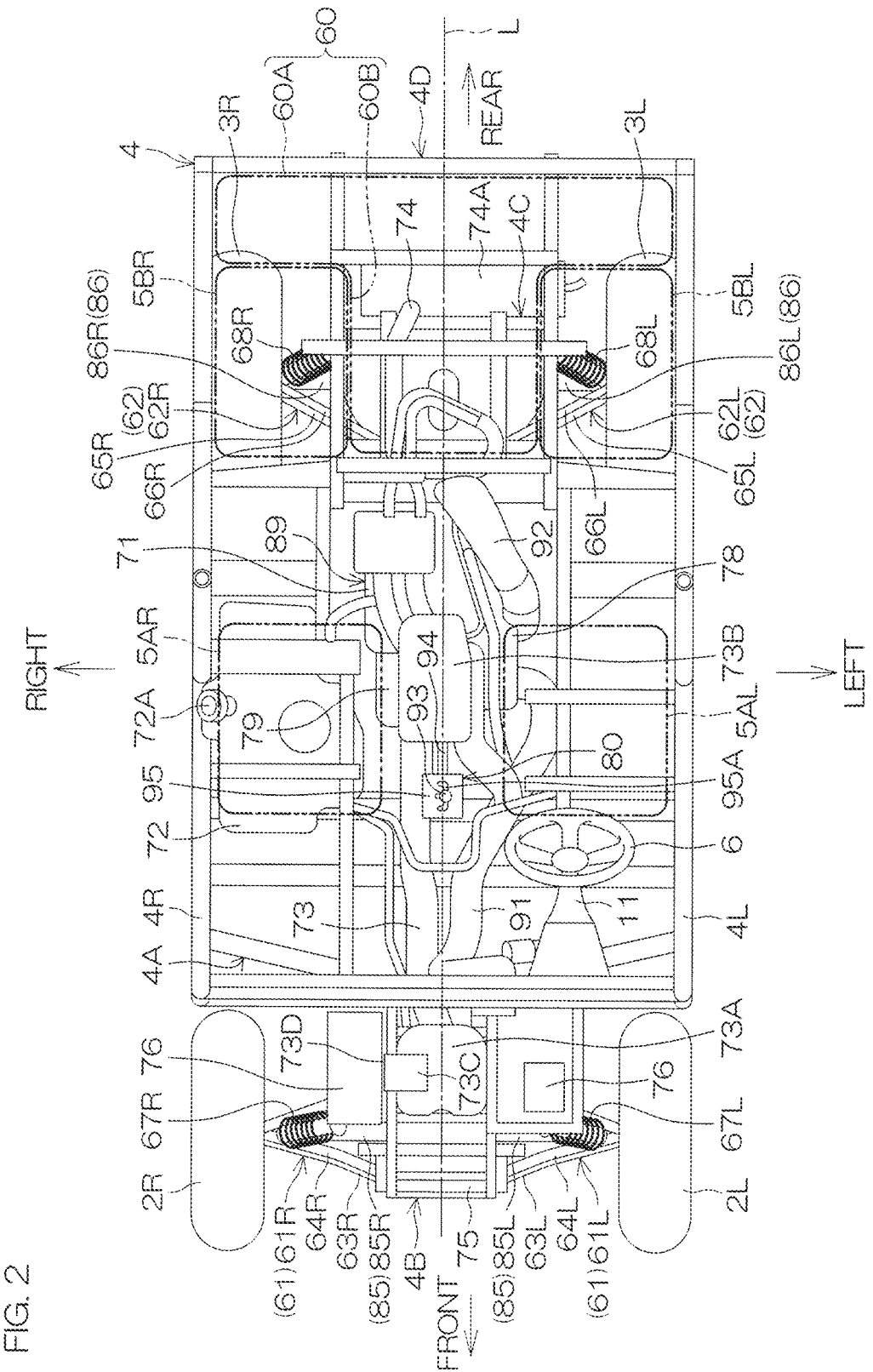
FIG. 2 is a schematic plan view of a vehicle in a state where a roof and a body panel, etc., are removed.

FIG. 2 is a schematic plan view of the vehicle 1 in a state where the roll cage 7, the doors 9, the body panel 10, and the roof 13 are removed.

The vehicle 1 includes a rear deck 60. The rear deck 60 includes a laterally elongated portion 60A located farther rearward than the rear seat 5B, and a projection 60B projecting forward from a center of the laterally elongated portion 60A and located between the left rear seat 5BL and the right rear seat 5BR, and is T-shaped or substantially T-shaped in plan view.

The vehicle 1 includes a pair of right and left front suspensions 61 suspending the pair of right and left front wheels 2 respectively, and a pair of right and left rear suspensions 62 suspending the pair of right and left rear wheels 3 respectively. The pair of right and left front suspensions 61 include a front suspension 61R suspending the right front wheel 2R, and a front suspension 61L suspending the left front wheel 2L. The pair of right and left rear suspensions 62 include a rear suspension 62R suspending the right rear wheel 3R, and a rear suspension 62L suspending the left rear wheel 3L. The frame 4 is supported by the pair of front wheels 2 and the pair of rear wheels 3 via the suspensions 61L, 61R, 62L, and 62R. The suspensions 61L, 61R, 62L, and 62R in the present preferred embodiment are preferably of the double wishbone type.

The front suspension 61L includes a front upper arm 64L and a front lower arm 63L aligned in the up-down direction. The front suspension 61R includes a front upper arm 64R and a front lower arm 63R aligned in the up-down direction. The right and left pair of front lower arms 63R and 63L are an example of front arms according to a preferred embodiment of the present invention. Each of the front lower arms 63L and 63R and the front upper arms 64L and 64R is preferably an A-arm.

A left end of each of the front lower arm 63L and the front upper arm 64L is coupled to a knuckle arm (not shown) of the front wheel 2L. A right end of each of the front lower arm 63R and the front upper arm 64R is coupled to a knuckle arm (not shown) of the front wheel 2R. The front lower arms 63R and 63L and the front upper arms 64R and 64L support the right and left front wheels 2R and 2L. A right end of each of the front lower arm 63L and the front upper arm 64L is mounted to the front frame 4B so as to be swingable up and down. A left end of each of the front lower arm 63R and the front upper arm 64R is mounted to the front frame 4B so as to be swingable up and down.

A lower end of a shock absorber 67L is coupled to a left end portion of the front upper arm 64L, and a lower end of a shock absorber 67R is coupled to a right end portion of the front upper arm 64R. Upper ends of the shock absorbers 67L and 67R are coupled to the front frame 4B.

The rear suspension 62L includes a rear upper arm 66L and a rear lower arm 65L aligned in the up-down direction. The rear suspension 62R includes a rear upper arm 66R and a rear lower arm 65R aligned in the up-down direction. The right and left pair of rear lower arms 65R and 65L are an example of rear arms according to a preferred embodiment of the present invention. Each of the rear lower arms 65L and 65R and the rear upper arms 66L and 66R is preferably an A-arm.

A left end of each of the rear lower arm 65L and the rear upper arm 66L is coupled to a knuckle arm (not shown) of the rear wheel 3L. A right end of each of the rear lower arm 65R and the rear upper arm 66R is coupled to a knuckle arm (not shown) of the rear wheel 3R. The rear lower arms 65R and 65L and the rear upper arms 66R and 66L support the right and left rear wheels 3R and 3L. A right end of the rear lower arm 65L is mounted to the rear frame 4C so as to be swingable up and down. A right end of the rear upper arm 66L is mounted to the frame 4 so as to be swingable up and down. A left end of the rear lower arm 65R is mounted to the rear frame 4C so as to be swingable up and down. A left end of the rear upper arm 66R is mounted to the frame 4 so as to be swingable up and down.

A lower end of a shock absorber 68L is coupled to a left end portion of the rear upper arm 66L, and a lower end of a shock absorber 68R is coupled to a right end portion of the rear upper arm 66R. Upper ends of the shock absorbers 68L and 68R are coupled to the upper frame 4D.

Figure 3:
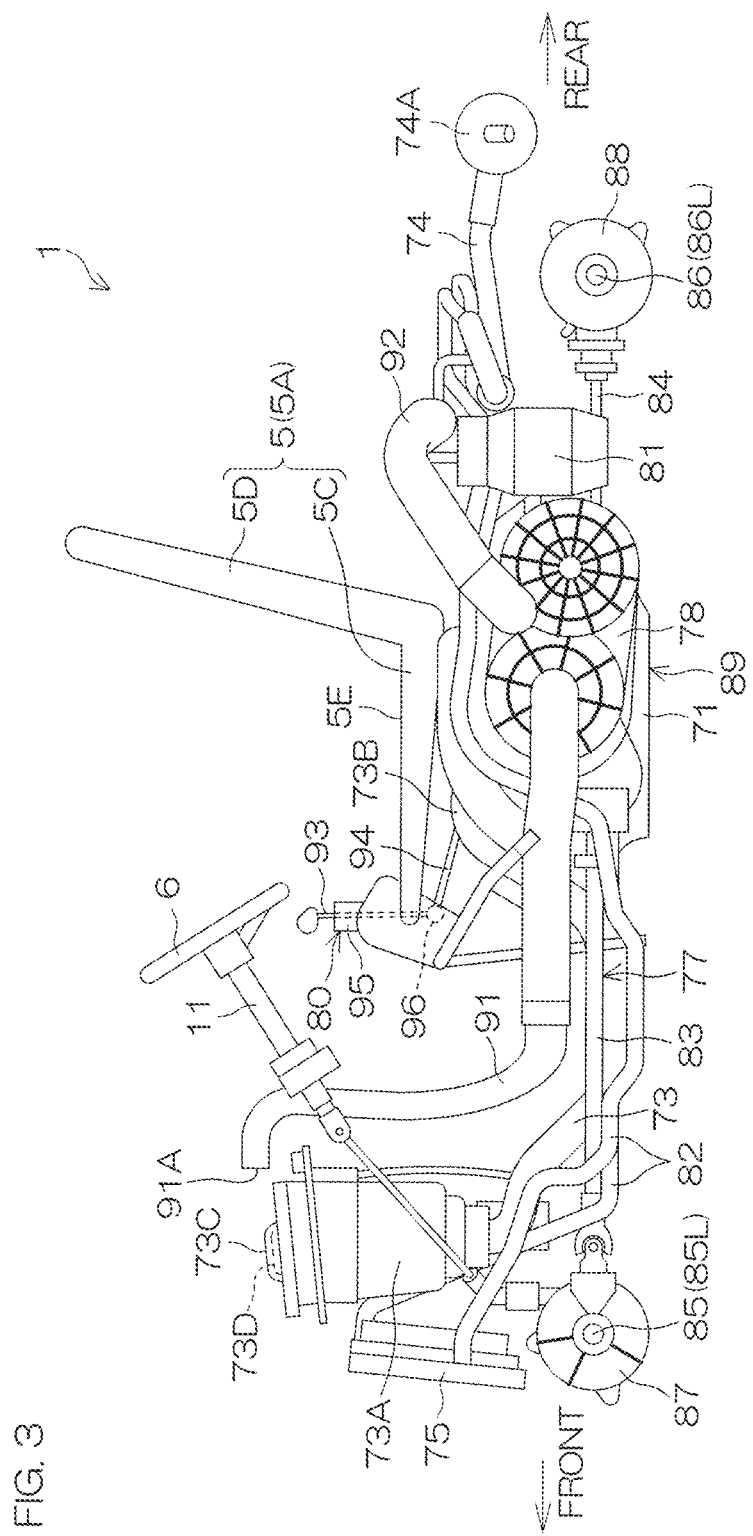
FIG. 3 is a schematic side view of the vehicle in a state where the roof, the body panel, and frames, etc., are removed.

FIG. 3 is a schematic left side view of the vehicle 1 in a state where the frame 4, the roll cage 7, the doors 9, the body panel 10, the roof 13, etc., are removed. Referring to FIG. 2 and FIG. 3, the vehicle 1 includes an engine 71, a fuel tank 72, an intake passage 73, an exhaust passage 74, a radiator 75, batteries 76, a transmission 77, a continuously variable transmission 78, a shiftable transmission 79, and a shifter 80.

The engine 71 is preferably an internal combustion engine and is, for example, a water-cooled, four-cycle, parallel two-cylinder engine in the present preferred embodiment. The engine 71 is coupled to and supported by the intermediate frame 4A. The engine 71 is located at a center of the vehicle 1 in regard to the right-left direction. Specifically, at least a portion of the engine 71 overlaps with a virtual centerline L passing through the center of the vehicle 1 and extending in the front-rear direction in plan view. At least a front end portion of the engine 71 is located between the two front seats 5A in plan view. The engine 71 is located at a position lower than the seat surfaces 5E of the respective front seats 5A. The engine 71 is, for example, a dry-sump engine, and an oil tank 81 that stores engine oil for the engine 71 is located to the rear of the engine 71.

The fuel tank 72 stores fuel for the engine 71. The fuel for the engine 71 is, for example, gasoline. The fuel tank 72 is located to the right of the engine 71 so as to be aligned with the engine 71 in the right-left direction and is coupled to the intermediate frame 4A. The fuel tank 72 is located at a position lower than the seat surfaces 5E of the respective seats 5A and at least a portion of the fuel tank 72 overlaps with the right front seat 5AR in plan view. A fuel inlet (not shown) and a fuel cap 72A that opens and closes the fuel inlet are provided at a right end portion of an upper surface of the fuel tank 72.

The intake passage 73 extends in the front-rear direction at a position lower than the feet of the occupants seated on the front seats 5. An intake box 73A is provided at a front end portion of the intake passage 73 and an accumulator 73B is provided at a rear end portion of the intake passage 73. The intake box 73A is coupled to the front frame 4B. A projection 73C projects upward from an upper surface of the intake box 73A. An air inlet 73D that takes air into the intake box 73A is provided, for example, in a right surface of the projection 73C. The accumulator 73B is located in front of the engine 71 and is connected to intake ports (not shown) at the respective cylinders of the engine 71 via a throttle body (not shown). Air at a periphery of the intake box 73A is taken into the intake box 73A from the air inlet 73D. The air taken into the intake box 73A is cleaned by passing through a filter (not shown) inside the intake box 73A. The cleaned air continues to flow inside the intake passage 73, arrives at the accumulator 73B, and is supplied to the intake ports at the respective cylinders of the engine 71 via the throttle body.

The exhaust passage 74 extends rearward from exhaust ports (not shown) at the respective cylinders of the engine 71. A muffler 74A is provided at a rear end portion of the exhaust passage 74. The muffler 74A is fixed to the rear frame 4C. Exhaust gas generated in the engine 71 flows through the exhaust passage 74 and is discharged from the muffler 74A.

The radiator 75 is located farther forward than the intake box 73A and is coupled to the front frame 4B. The radiator 75 and the engine 71 are linked via a cooling pipe 82. Cooling water flows through the cooling pipe 82 and is thus circulated between the radiator 75 and the engine 71. The circulated cooling water is cooled when flowing through the radiator 75 and cools the engine 71 when flowing through the engine 71.

The batteries 76 supply electric power to electrical elements (not shown) in the vehicle 1. The batteries 76 are provided, for example, one each at the right and the left of the intake box 73A and are fixed to the front frame 4B.

The transmission 77 includes a front propeller shaft 83, a rear propeller shaft 84, front drive shafts 85, rear drive shafts 86, a front gearing 87, and a rear gearing 88. The front propeller shaft 83 extends forward from the engine 71, and the rear propeller shaft 84 extends rearward from the engine 71. A pair of right and left front drive shafts 85 extend rightward and leftward. Of the pair of front drive shafts 85, a left end of the front drive shaft 85L at the left is linked to the left front wheel 2L and a right end of the front drive shaft 85R at the right is linked to the right front wheel 2R. Similarly, a pair of right and left rear drive shafts 86 extend rightward and leftward. Of the pair of rear drive shafts 86, a left end of the rear drive shaft 86L at the left is linked to the left rear wheel 3L and a right end of the rear drive shaft 86R at the right is linked to the right rear wheel 3R.

The front gearing 87 is coupled to the front frame 4B. The front gearing 87 is supported by the front frame 4B. The front gearing 87 links each of a right end of the front drive shaft 85L and a left end of the front drive shaft 85R to a front end of the front propeller shaft 83. The rear gearing 88 is coupled to the rear frame 4C. The rear gearing 88 is supported by the rear frame 4C. The rear gearing 88 links each of a right end of the rear drive shaft 86L and a left end of the rear drive shaft 86R to a rear end of the rear propeller shaft 84.

The continuously variable transmission 78 is preferably a belt transmission in the present preferred embodiment and is located to a side, and more specifically at the left of the engine 71. The fuel tank 72 located to the right of the engine 71 sandwiches the engine 71 with the continuously variable transmission 78. The shiftable transmission 79 is preferably a gear transmission and is located farther forward than the engine 71. The shiftable transmission 79 is shiftable, for example, to any of three shift stages of high speed, low speed, and reverse. The engine 71, the continuously variable transmission 78, and the shiftable transmission 79 are integral and define a drive unit 89.

An intake duct 91 and an exhaust duct 92 are connected to the continuously variable transmission 78. The intake duct 91 extends in the front-rear direction at a position lower than the feet of the occupants seated on the front seats 5. A front portion of the intake duct 91 is bent upward and a front end portion of the intake duct 91 is bent and extends forward. An air inlet 91A that takes air into the intake duct 91 is provided at a front end of the intake duct 91. The air inlet 91A is at the same or substantially the same height position as the air inlet 73D of the intake box 71A. A rear end portion of the intake duct 91 branches in two and is connected to the continuously variable transmission 78. The exhaust duct 92 extends, for example, rearward and upward from the continuously variable transmission 78. Air taken into the intake duct 91 from the air inlet 91A is guided into the continuously variable transmission 78 by the intake duct 91 and cools an interior of the continuously variable transmission 78. The air inside the continuously variable transmission 78 is discharged through the exhaust duct 92.

The shifter 80 includes an operation lever 93 extending in the up-down direction, a shift rod 94 extending in the forward-rearward direction, and a shift gate 95 holding the operation lever 93. The operation lever 93 is inserted in a groove 95A in the shift gate 95 and is movable forward and rearward along the groove 95A. A lower end of the operation lever 93 and a front end of the shift rod 94 are mutually coupled by a ball joint 96 (see FIG. 3). A rear end of the shift rod 94 is coupled to the shiftable transmission 79. The shift gate 95 is fixed to the intermediate frame 4A. When the driver seated on the left front seat 5AL grips an upper end portion of the operation lever 93 and moves it forward or rearward, a shifting operation force by the driver is input into the shiftable transmission 79 and the shiftable transmission 79 is shifted.

A rotational power of the engine 71 is continuously shifted by the continuously variable transmission 78 and then transmitted to the shiftable transmission 79. The rotational power transmitted to the shiftable transmission 79 is shifted at a shift ratio of a shift stage among high speed, low speed, and reverse by the shiftable transmission 79 and then transmitted to the front propeller shaft 83 and the rear propeller shaft 84. The rotational power transmitted to the front propeller shaft 83 is transmitted to the front gearing 87. The front gearing 87 transmits the rotational power to the front drive shafts 85L and 85R. The rotational power is thus transmitted to the right and left front wheels 2. The rotational power transmitted to the rear propeller shaft 84 is transmitted to the rear gearing 88. The rear gearing 88 transmits the rotational power to the rear drive shafts 86L and 86R. The rotational power is thus transmitted to the right and left rear wheels 3. The front gearing 87 of the present preferred embodiment includes a differential gear and transmits the rotational power from the front propeller shaft 83 to the front drive shafts 85L and 85R while allowing a rotational difference between the front drive shafts 85L and 85R. The rear gearing 88 may or may not include a differential gear.

Figure 4:
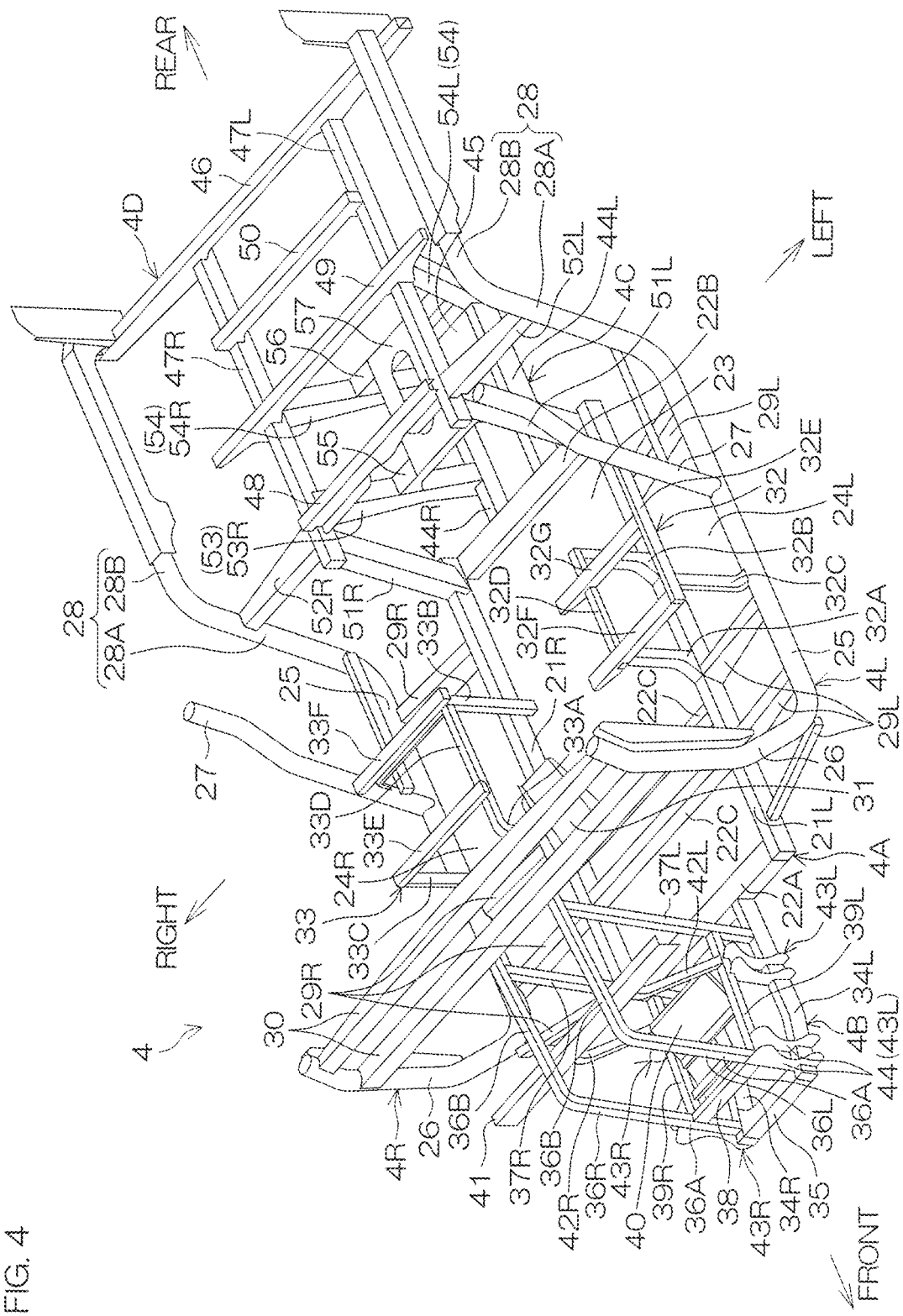
FIG. 4 is a schematic perspective view of the frame included in the vehicle.

FIG. 4 is a schematic perspective view of the frame 4. The above-described intermediate frame 4A, left frame 4L, right frame 4R, front frame 4B, rear frame 4C, and upper frame 4D shall now be described in detail.

The intermediate frame 4A is located between the front frame 4B and the rear frame 4C in regard to the front-rear direction. The intermediate frame 4A includes a left side frame portion 21L, a right side frame portion 21R, a front cross member 22A, a rear cross member 22B, a central plate frame portion 23, a left plate frame portion 24L, and a right plate frame portion 24R. The left side frame portion 21L and the right side frame portion 21R are parallel or substantially parallel to each other and extend in the front-rear direction. The front cross member 22A extends in the right-left direction and links front ends of the right side frame portion 21R and the left side frame portion 21L to each other. The rear cross member 22B extends in the right-left direction and links rear ends of the right side frame portion 21R and the left side frame portion 21L to each other. The frame 4 may include one or more cross members 22C that extend in the right-left direction between the front cross member 22A and the rear cross member 22B and link intermediate portions of the right side frame portion 21R and the left side frame portion 21L to each other.

The central plate frame portion 23 extends, along or substantially along a horizontal plane, between the left side frame portion 21L and the right side frame portion 21R. The left side frame portion 21L and the right side frame portion 21R are linked to each other by the central plate frame portion 23. The left plate frame portion 24L is slightly inclined with respect to a horizontal direction so as to extend leftward and upward from the left side frame portion 21L. The right plate frame portion 24R is slightly inclined with respect to a horizontal direction so as to extend rightward and upward from the right side frame portion 21R.

The left frame 4L extends to an outer side (the left side) of the left side frame portion 21L and is located at a higher position than the central plate frame portion 23. The right frame 4R extends to an outer side (the right side) of the right side frame portion 21R and is located at a higher position than the central plate frame portion 23. The left frame 4L and the right frame 4R are parallel or substantially parallel to each other and face each other in the right-left direction. Each of the left frame 4L and the right frame 4R includes a lateral frame portion 25, a first vertical frame portion 26, a second vertical frame portion 27, and an extension frame portion 28.

The lateral frame portions 25 extend linearly in the front-rear direction. The left side frame portion 21L and the lateral frame portion 25 of the left frame 4L are linked to each other by the left plate frame portion 24L. The right side frame portion 21R and the lateral frame portion 25 of the right frame 4R are linked to each other by the right plate frame portion 24R. The frame 4 may include one or more cross members 29L that extend in the right-left direction and link the left side frame portion 21L and the lateral frame portion 25 of the left frame 4L. The frame 4 may include one or more cross members 29R that extend in the right-left direction and link the right side frame portion 21R and the lateral frame portion 25 of the right frame 4R.

The first vertical frame portions 26 extend upward from front ends of the lateral frame portions 25. Upper end portions of the respective first vertical frame portions 26 of the right frame 4R and the left frame 4L are linked to each other by cylindrical cross members 30 extending in the right-left direction. Each cross member 30 is an example of a cylindrical frame according to a preferred embodiment of the present invention. The frame 4 may include a plurality of cross members 30 and two cross members 30 are juxtaposed in the up-down direction in the present preferred embodiment. A lateral cross-sectional shape of each cross member 30 may be circular or polygonal (for example, rectangular). The frame 4 includes a steering support 31 projecting rearward from a left portion of the lower cross member 30. The steering shaft 11 is coupled to the steering support 31. The second vertical frame portions 27 extend upward from intermediate portions of the lateral frame portions 25. Each extension frame portion 28 includes a vertical portion 28A, extending at an incline upward and rearward from a rear end of a lateral frame portion 25, and a lateral portion 28B, extending horizontally or substantially horizontally rearward from an upper end of the vertical portion 28A. Upper ends of the first vertical frame portions 26, upper ends of the second vertical frame portions 27, and rear ends of the lateral portions 28B of the extension frame portions 28 are coupled to the roll cage 7. The left frame 4L and the right frame 4R may be portions of the roll cage 7.

The intermediate frame 4A includes a left front seat support 32 that supports the left front seat 5AL, and a right front seat support 33 that supports the right front seat 5AR. The left front seat support 32 includes vertical supporting frame portions 32A, 32B, and 32C and horizontal supporting frame portions 32D, 32E, 32F, and 32G. The vertical supporting frame portions 32A and 32B are aligned in the front-rear directions and extend upward from the left side frame portion 21L. The vertical supporting frame portion 32C extends upward from the lateral frame portion 25 of the left frame 4L. The horizontal supporting frame portion 32D extends in the front-rear direction and links upper ends of the vertical supporting frame portions 32A and 32B to each other. The horizontal supporting frame portion 32E extends horizontally or substantially horizontally rearward from an upper end of the vertical supporting frame portion 32C and is connected to the second vertical frame portion 27 of the left frame 4L. The horizontal supporting frame portions 32F and 32G extend in the right-left direction and are aligned in the front-rear direction. Each of the horizontal supporting frame portions 32F and 32G link the horizontal supporting frame portions 32D and 32E to each other. The left front seat 5AL is coupled to the horizontal supporting frame portions 32D, 32F, and 32G of the left front seat support 32.

The right front seat support 33 includes vertical supporting frame portions 33A, 33B, and 33C and horizontal supporting frame portions 33D, 33E, and 33F. The vertical supporting frame portions 33A and 33B are aligned in the front-rear directions and extend upward from the right side frame portion 21R (more specifically, from the central plate frame portion 23 in a vicinity of the right side frame portion 21R). The vertical supporting frame portion 33C extends upward from the lateral frame portion 25 of the right frame 4R. The horizontal supporting frame portion 33D extends in the front-rear direction and link upper ends of the vertical supporting frame portions 33A and 33B to each other. The horizontal supporting frame portion 33E extends rightward from the horizontal supporting frame portion 33D and is connected to an upper end of the vertical supporting frame portion 33C. The horizontal supporting frame portion 33F extends rightward from the upper end of the vertical supporting frame portion 33B and is connected to the second vertical frame portion 27 of the right frame 4R. The right front seat 5AR is coupled to the horizontal supporting frame portions 33D, 33E, and 33F of the right front seat support 33.

The front frame 4B includes a pair of right and left side frame portions 34R and 34L extending forward from the front cross member 22A of the intermediate frame 4A. Front ends of the side frame portions 34R and 34L are linked to each other by a cross member 35 extending in the right-left direction. The front frame 4B includes a pair of supporting frame portions 36L and 36R and a pair of supporting frame portions 37L and 37R.

The supporting frame portion 36L rises upward from a front end portion of the side frame portion 34L and thereafter bends and extends rearward. The supporting frame portion 36R rises upward from a front end portion of the side frame portion 34R and thereafter bends and extends rearward. That is, each of the supporting frame portion 36L and the supporting frame portion 36R includes a vertical portion 36A, extending upward from a front end portion of the side frame portion 34L or 34R, and a lateral portion 36B, extending rearward from an upper end of the vertical portion 36A. A rear end of the lateral portion 36B of each of the supporting frame portion 36L and the supporting frame portion 36R is connected to the lower cross member 30 of the two cross members 30. The supporting frame portion 37L rises upward from a rear end portion of the side frame portion 34L and is connected to a rear end portion of the lateral portion 36B of the supporting frame portion 36L. The supporting frame portion 37R rises upward from a rear end portion of the side frame portion 34R and is connected to a rear end portion of the lateral portion 36B of the supporting frame portion 36R. The intake box 73A is located between the supporting frame portion 36L and the supporting frame portion 36R in the front frame 4B and is coupled to the front frame 4B.

The vertical portions 36A of the supporting frame portions 36R and 36L are linked to each other by a cross member 38 extending in the right-left direction. The vertical portion 36A of the supporting frame portion 36L and the supporting frame portion 37L are linked by a cross member 39L extending in the front-rear direction. The vertical portion 36A of the supporting frame portion 36R and the supporting frame portion 37R are linked by a cross member 39R extending in the front-rear direction. The cross members 39L and 39R are linked by a plate 40 that is slightly inclined with respect to the horizontal direction so as to extend rearward and upward. The front gearing 87 (see FIG. 3) coupled to the front frame 4B is located below the plate 40.

The lateral portions 36B of the supporting frame portions 36R and 36L are linked to each other by a cross member 41 extending in the right-left direction. A left end portion of the cross member 41 projects farther leftward than the supporting frame portion 36L and a right end portion of the cross member 41 projects farther rightward than the supporting frame portion 36R. The upper ends of the above-described shock absorbers 67L and 67R are coupled respectively to the left end portion and the right end portion of the cross member 41. The cross members 39L and 41 are linked to each other by a vertical frame portion 42L that rises from a rear end portion of the cross member 39L. The cross members 39R and 41 are linked to each other by a vertical frame portion 42R that rises from a rear end portion of the cross member 39R.

The front frame 4B includes suspension supports 43L and 43R. A pair of front and rear suspension supports 43L are provided. The front suspension support 43L is provided at a lower end portion of the vertical portion 36A of the supporting frame portion 36L. The rear suspension support 43L links the respective rear end portions of the side frame portion 34L and the cross member 39L to each other. Similarly, a pair of front and rear suspension supports 43R are provided. The front suspension support 43R is provided at a lower end portion of the vertical portion 36A of the supporting frame portion 36R. The rear suspension support 43R links the respective rear end portions of the side frame portion 34R and the cross member 39R to each other. Each of the suspension supports 43L and 43R includes, for example, two brackets 44 that are located parallel or substantially parallel to each other.

The respective right ends of the front lower arm 63L and the front upper arm 64L of the front suspension 61L (see FIG. 2) are mounted to the suspension support 43L of the front frame 4B so as to be swingable up and down. The respective left ends of the front lower arm 63R and the front upper arm 64R of the front suspension 61R (see FIG. 2) are mounted to the suspension support 43R of the front frame 4B so as to be swingable up and down.

The rear frame 4C includes a pair of right and left side frame portions 44R and 44L extending rearward from the rear cross member 22B of the intermediate frame 4A, and a plate frame portion 45 extending along or substantially along the horizontal plane and between the side frame portion 44L and the side frame portion 44R. The side frame portion 44L and the side frame portion 44R are linked to each other by the plate frame portion 45. The right end of the rear lower arm 65L of the rear suspension 62L (see FIG. 2) is mounted to the side frame portion 44L of the rear frame 4C so as to be swingable up and down. The left end of the rear lower arm 65R of the rear suspension 62R (see FIG. 2) is mounted to the side frame portion 44R of the rear frame 4C so as to be swingable up and down.

The upper frame 4D includes a cross member 46, a pair of right and left supporting frame portions 47R and 47L, and cross members 48, 49, and 50, extending in the right-left direction, and is located above the rear frame 4C. The cross member 46 extends in the right-left direction and links the rear ends of the respective lateral portions 28B of the left frame 4L and the right frame 4R to each other. The supporting frame portions 47L and 47R are parallel or substantially parallel to each other, are located between the lateral portion 28B of the left frame 4L and the lateral portion 28B of the right frame 4R, and extend forward from the cross member 46. A front end portion of the supporting frame portion 47L is located above a rear end portion of the left side frame portion 21L of the intermediate frame 4A, and a front end portion of the supporting frame portion 47R is located above a rear end portion of the right side frame portion 21R. The cross members 48, 49, and 50 are aligned in that order from the front and link the supporting frame portion 47L and the supporting frame portion 47R. A left end portion of the cross member 49 projects farther leftward than the supporting frame portion 47L, and a right end portion of the cross member 49 projects farther rightward than the supporting frame portion 47R.

The left rear seat 5BL is coupled to the supporting frame portion 47L. The above-described right rear seat 5BR is coupled to the supporting frame portion 47R. The above-described rear deck 60 is coupled to and supported by the supporting frame portion 47L, the supporting frame portion 47R, cross member 49, cross member 50, etc., of the upper frame 4D. The upper ends of the above-described shock absorbers 68L and 68R are respectively coupled to the left end portion and the right end portion of the cross member 49. The above-described muffler 74A is located below the supporting frame portions 47L and 47R at the upper frame 4D.

The frame 4 may include a cross member 51L extending in the up-down direction and linking the front end portion of the supporting frame portion 47L and the rear end portion of the left side frame portion 21L. The frame 4 may include a cross member 51R extending in the up-down direction and linking the front end portion of the supporting frame portion 47R and the rear end portion of the right side frame portion 21R. The frame 4 may include a cross member 52L extending in the right-left direction and linking the front end portion of the supporting frame portion 47L and the extension frame portion 28 of the left frame 4L. The frame 4 may include a cross member 52R extending in the right-left direction and linking the front end portion of the supporting frame portion 47R and the extension frame portion 28 of the right frame 4R.

The frame 4 includes a pair of right and left front vertical frames 53 respectively extending upward from the side frame portions 44R and 44L of the rear frame 4C, and a pair of right and left rear vertical frames 54 respectively extending upward from the side frame portions 44R and 44L. The pair of front vertical frames 53 and the pair of rear vertical frames 54 are an example of a pair of vertical frames according to a preferred embodiment of the present invention. Although not visible in FIG. 4 due to being hidden behind the cross member 51L, an upper end of the left front vertical frame 53L of the pair of front vertical frames 53 is linked to the supporting frame portion 47L. An upper end of the right front vertical frame 53R is linked to the supporting frame portion 47R. The pair of rear vertical frames 54 are located farther rearward than the pair of front vertical frames 53. The upper end of the left rear vertical frame 54L of the pair of rear vertical frames 54 is linked to the supporting frame portion 47L and the upper end of the right rear vertical frame 54R is linked to the supporting frame portion 47R.

The right end of the rear upper arm 66L of the rear suspension 62L (see FIG. 2) is mounted to the front vertical frame 53L and the rear vertical frame 54L extending upward from the side frame portion 44L, so as to be swingable up and down. The left end of the rear upper arm 66R of the rear suspension 62R (see FIG. 2) is mounted to the front vertical frame 53R and the rear vertical frame 54R extending upward from the side frame portion 44R, so as to be swingable up and down.

A cross member 55 extending in the right-left direction links intermediate portions of the pair of front vertical frames 53 to each other. A cross member 56 extending in the right-left direction links intermediate portions of the pair of rear vertical frames 54 to each other. A plate 57 located along or substantially along the horizontal plane links the cross member 55 and the cross member 56. The rear gearing 88 (see FIG. 3) coupled to the rear frame 4C is located below the plate 57.

Figure 5:
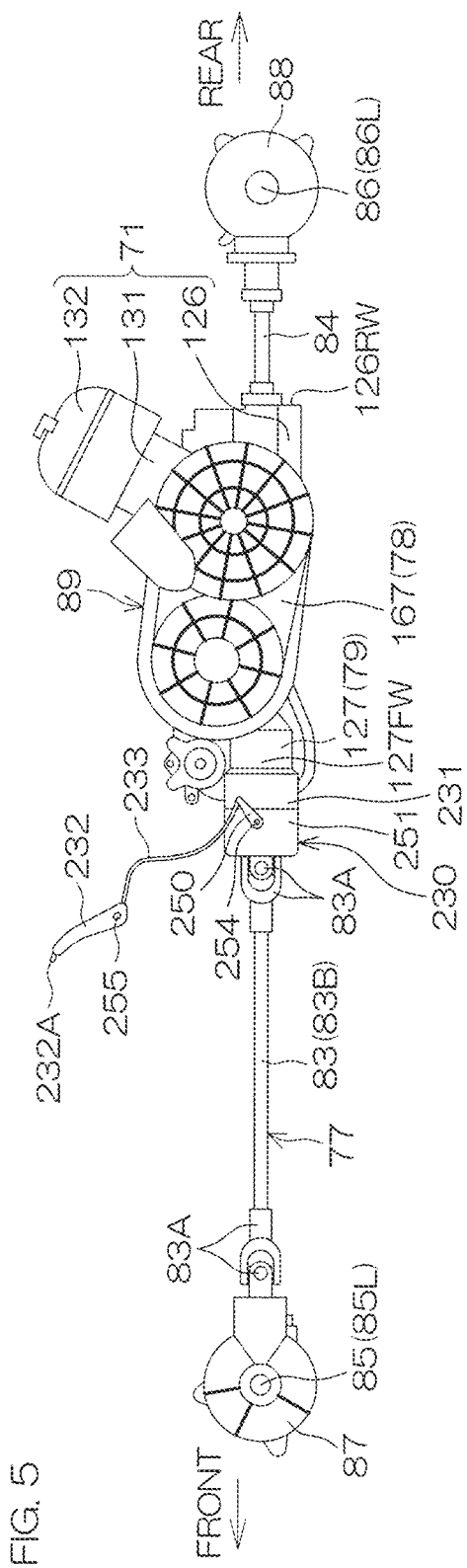
FIG. 5 is a schematic side view of a drive unit, a transmission, and a brake unit included in the vehicle.

FIG. 5 is a schematic left side view of the drive unit 89, the transmission 77, and a brake unit 230. The engine 71 of the drive unit 89 includes a crankcase 126 housing a crankshaft (not shown), a cylinder block 131 housing a piston (not shown), and a cylinder head 132 joined to an upper portion of the cylinder block 131. The continuously variable transmission 78 of the drive unit 89 includes a CVT case 167 that defines a housing of the continuously variable transmission 78. The CVT case 167 is located to the left of the crankcase 126 and is joined to the crankcase 126. The shiftable transmission 79 of the drive unit 89 includes a transmission case 127 that defines a housing of the shiftable transmission 79. The transmission case 127 is located in front of the crankcase 126 and to the right of the CVT case 167 and is joined to the crankcase 126 and the CVT case 167. A front portion of the transmission case 127 projects farther forward than a front end of the CVT case 167.

The front propeller shaft 83 of the transmission 77 extends forward and penetrates through a front wall 127FW of the transmission case 127 and is linked to the front gearing 87. The rear propeller shaft 84 of the transmission 77 extends rearward and penetrates through a rear wall 126RW of the crankcase 126 and is linked to the rear gearing 88. The front propeller shaft 83 may include a single shaft or a plurality of shafts 83B linked via joints 83A. The same also applies to the rear propeller shaft 84.

Figure 6:
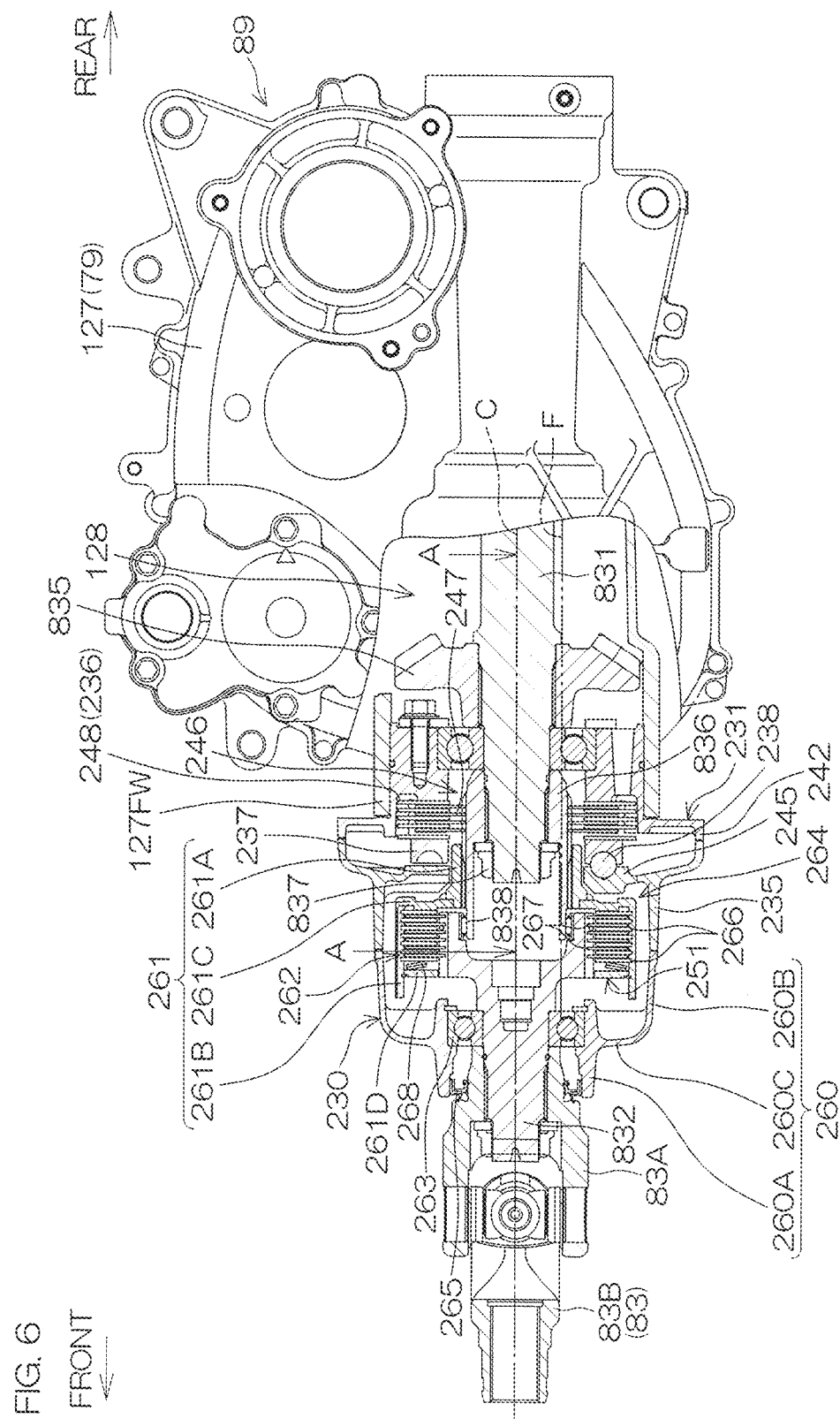
FIG. 6 is a partial sectional view of a shiftable transmission configuring the drive unit and of the brake unit.

The vehicle 1 further includes the brake unit 230. FIG. 6 is a partial sectional view of a shiftable transmission 79 and the brake unit 230. In association with the brake unit 230, a portion of the front propeller shaft 83 located in a periphery of the front wall 127FW of the transmission case 127 are separated into a first portion 831 and a second portion 832.

A bevel gear 835 meshing with a bevel gear 834 (see FIG. 7 described below) attached to an output shaft 833 of the shiftable transmission 79 is splined to an intermediate portion of the first portion 831. Thus, the first portion 831 and the bevel gear 835 are integrally rotatable around a rotation axis C of the front propeller shaft 83. The rotational power from the engine 71 is transmitted to the first portion 831 via the output shaft 833, the bevel gear 834, and the bevel gear 835 and is transmitted from the first portion 831 to the second portion 832. A tubular support 836 surrounding a front end portion of the first portion 831 to extend forward is splined to a portion of the front end portion of the first portion 831 farther forward than the bevel gear 835. Thus, the first portion 831 and the support 836 are integrally rotatable. The support 836 is fixed to the first portion 831 by a nut 837 attached to the front end portion of the first portion 831 so as not to move forward. The support 836 may be considered as part of the first portion 831.

The second portion 832 is arranged coaxially with the first portion 831. The second portion 832 is located downstream of the first portion 831 in the transmission direction of the rotational power from the engine 71 to the front wheels 2. The second portion 832 is located farther forward than the first portion 831. A rear end portion of the second portion 832 has a cylindrical shape surrounding a front end portion of the support 836. A bearing 838 is interposed between the rear end portion of the second portion 832 and the front end portion of the support 836. Thus the second portion 832 is relatively rotatable to the first portion 831. The joint 83A is coupled to a front end of the second portion 832.

Figure 7:
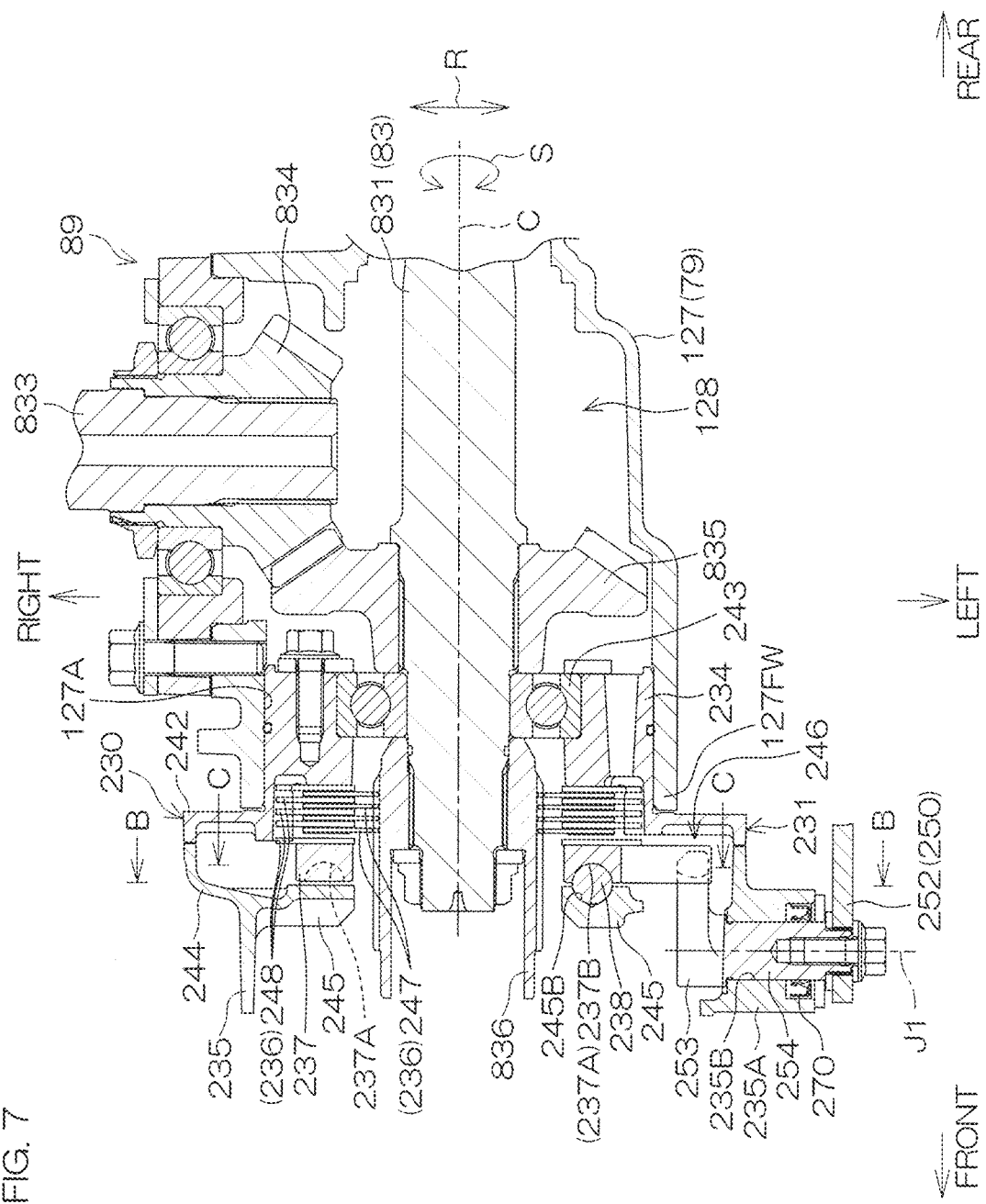
FIG. 7 is a sectional view along an A-A line in FIG. 6.

The brake unit 230 includes a wet oiling brake 231, a brake lever 250, an operating lever 232, a wire 233, and a torque limiter 251 (see also FIG. 11 described below). FIG. 7 is a sectional view along an A-A line in FIG. 6.

The wet oiling brake 231 is arranged downstream of the shiftable transmission 79 in the transmission direction of the rotational power from the engine 71 to the front wheels 2. The wet oiling brake 231 includes a first case 234 and a second case 235 that define a housing thereof, a first multiple disk clutch 236 generating a braking force, and a cam ring 237 and a ball 238 that operate or release the first multiple disk clutch 236.

The first case 234 has a cylindrical shape surrounding the first portion 831 of the front propeller shaft 83 in a contactless manner. The first case 234 is inserted into a through hole 127A into which the front propeller shaft 83 is inserted in a front wall 127FW of the transmission case 127 and is fixed to the transmission case 127 by a bolt or the like. The first case 234 is provided with a first outer flange 242 overreaching forward from the through hole 127A. The first outer flange 242 preferably has an annular shape jutting outward in a radial direction R with reference to the rotation axis C (a direction away from the front propeller shaft 83). A bearing 243 is interposed between a rear end portion of an inner circumferential surface of the first case 234 and the first portion 831. Thus, the first portion 831 is rotatably supported by the first case 234. An inner ring of the bearing 243 is positioned in a front-rear direction (an axial direction of the first portion 831) by being sandwiched between the bevel gear 835 and the support 836.

The second case 235 has a cylindrical shape surrounding the first portion 831 in a contactless manner. A rear end of the second case 235 is provided with an annular second outer flange 244 jutting outward in the radial direction R and an annular inner flange 245 jutting inward in the radial direction R. An outer circumferential portion of the second outer flange 244 is bent backward to be coupled to an outer circumferential portion of the first outer flange 242. Thus, the second case 235 is fixed to the first case 234. The first case 234 and the second case 235 define a first inner space 246 therebetween. The first inner space 246 is surrounded by the respective outer circumferential portions of the first outer flange 242 and the second outer flange 244. The first inner space 246 is defined between the first case 234 and the second outer flange 244 and between the first case 234 and the inner flange 245 in the front-rear direction.

Figure 8:
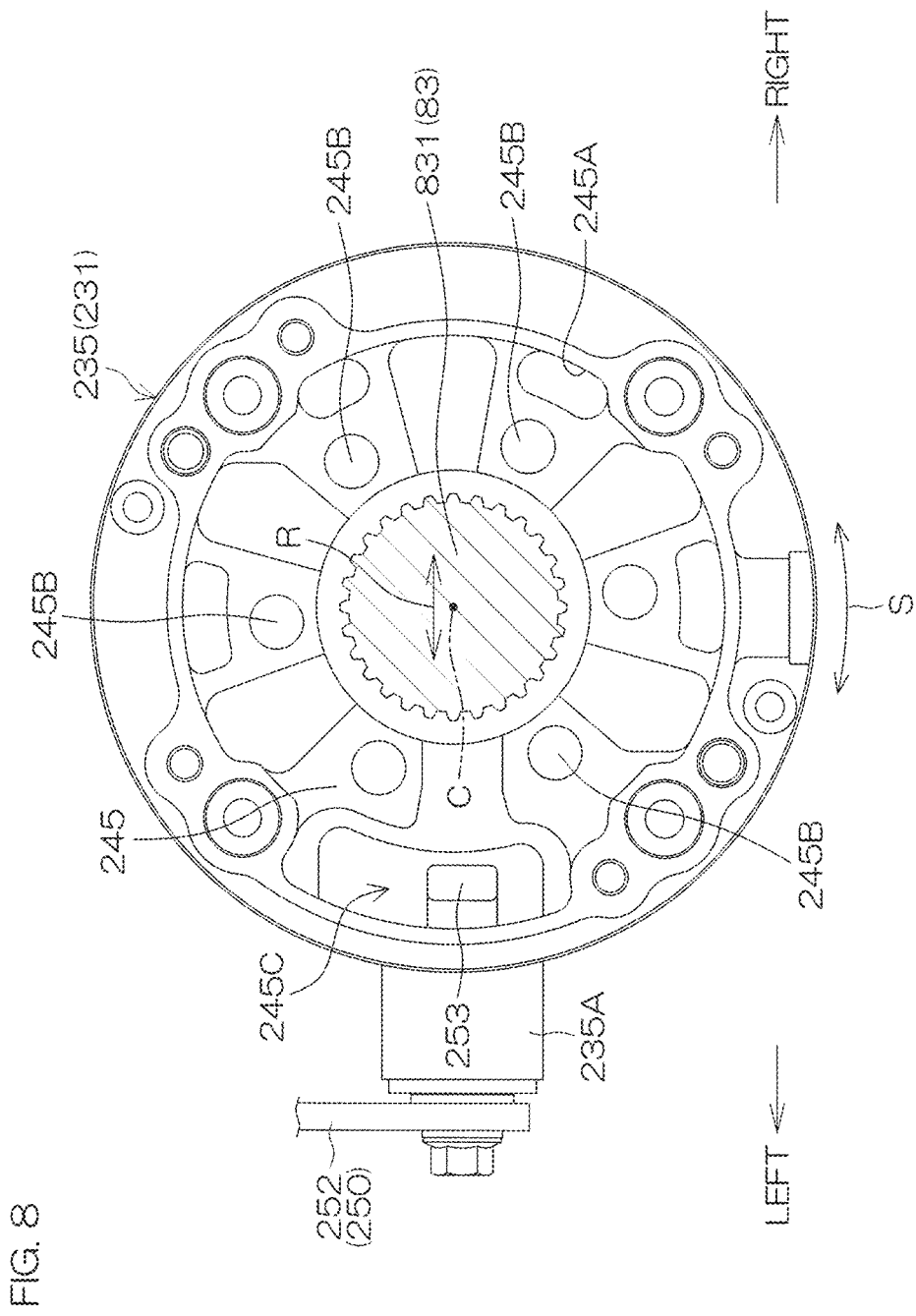
FIG. 8 is a sectional view along a B-B line in FIG. 7.

FIG. 8 is a sectional view along a B-B line in FIG. 7. An annular guide groove 245A extending in a circumferential direction S around the rotation axis C is formed on a rear surface of the inner flange 245. A groove bottom of the guide groove 245A is provided with a plurality of (for example, six) concave portions 245B at regular intervals in the circumferential direction S. Each of the concave portions 245B preferably has a semispherical shape dented forward. An opening 245C penetrating the inner flange 245 in the front-rear direction is located farther leftward than the guide groove 245A in the inner flange 245. The second case 235 is provided with a columnar projection 235A projecting leftward from a left end portion of an outer circumferential surface thereof. Referring to FIG. 7, the projection 235A is provided with a through hole 235B penetrating the projection 235A in a right-left direction. The through hole 235B is located farther forward than the inner flange 245.

A second inner space 128 accommodating a portion of the first portion 831 of the front propeller shaft 83, the output shaft 833, and the like is provided in the transmission case 127 of the shiftable transmission 79. The second inner space 128 also contains lubricating oil. The second inner space 128 is wider than the first inner space 246 of the wet oiling brake 231. The first inner space 246 is located forward of the second inner space 128 and is communicated with the second inner space 128 via the through hole 127A of the transmission case 127. In this state, the lubricating oil in the second inner space 128 can flow into the first inner space 246 through the through hole 127A. Thus, the first inner space 246 contains lubricating oil. The first inner space 246 also accommodates the first multiple disk clutch 236.

The first multiple disk clutch 236 includes a toric first clutch plate 247 and a toric second clutch plate 248. In the present preferred embodiment, a plurality of (specifically four) first clutch plates 247 are arranged in the front-rear direction along the support 836 of the first portion 831 of the front propeller shaft 83. An inner circumferential portion of each of the first clutch plates 247 is splined to an outer circumferential portion of the support 836. Thus, each of the first clutch plates 247 can be rotated with the first portion 831 and can be slid in the front-rear direction to the first portion 831.

In the present preferred embodiment, a plurality of (specifically five) second clutch plates 248 are respectively located farther forward than a first clutch plate 247 at the front end, between adjacent first clutch plates 247, and farther rearward than the first clutch plate 247 at the rear end. An outer circumferential portion of each of the second clutch plates 248 is splined to a front region of an inner circumferential portion of the first case 234. Thus, each of the second clutch plates 248 can be slid with respect to the first case 234 in the front-rear direction while having a fixed position in a rotating direction of the first clutch plate 247. It is sufficient that an outer circumferential portion of the second clutch plate 248 at the front end includes at least a portion that is splined to the front region of the inner circumferential portion of the first case 234.

The cam ring 237 has a toric shape surrounding the first portion 831 of the front propeller shaft 83 (specifically, a center portion of the support 836) in a contactless manner. A front surface and a rear surface of the cam ring 237 are flat in the radial direction R. Concave portions 237A of the number (in this case six) corresponding to concave portions 245B on the rear surface of the inner flange 245 of the second case 235 are provided on a front surface of the cam ring 237 at regular intervals in the circumferential direction S.

Figure 9:
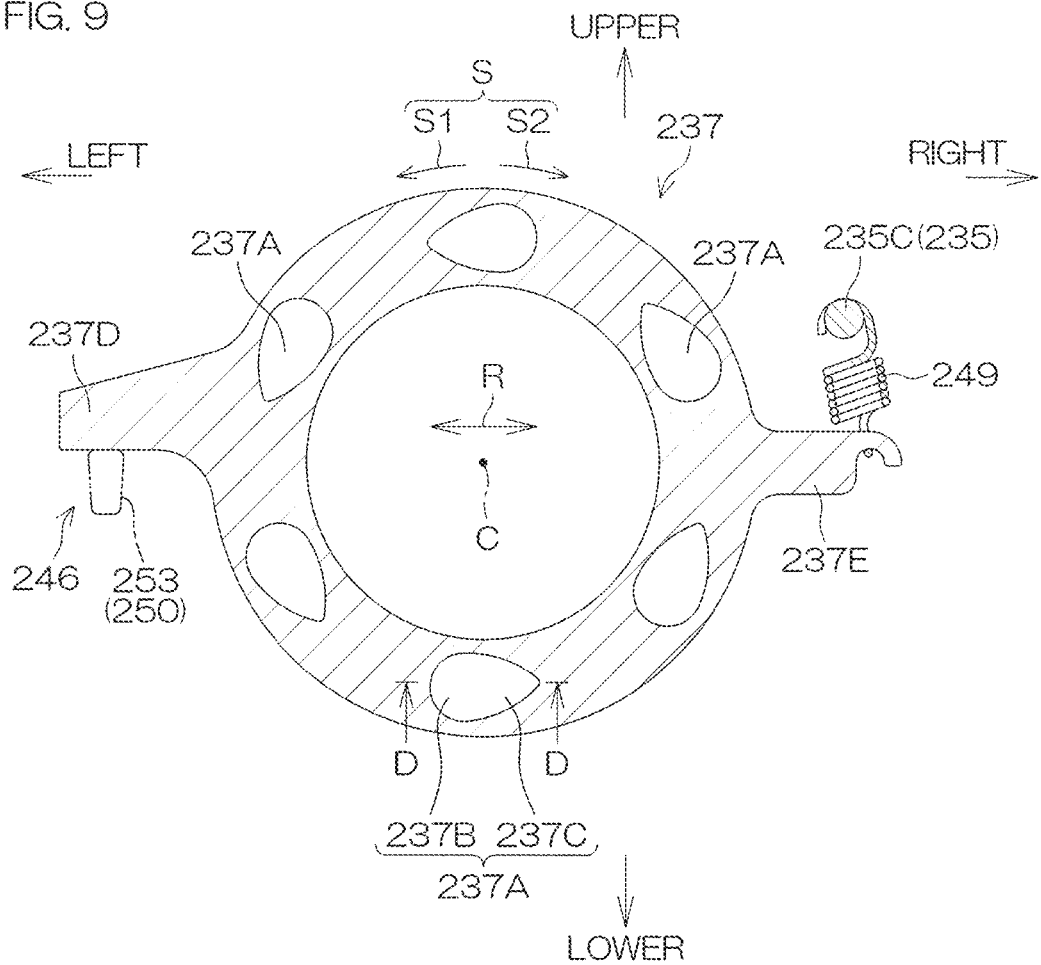
FIG. 9 is a sectional view along a C-C line in FIG. 7.
Figure 10:
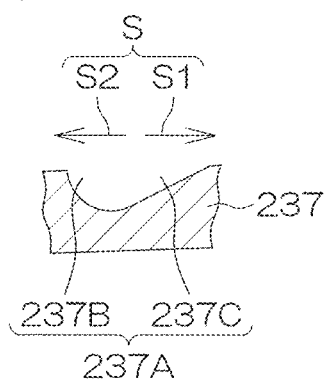
FIG. 10 is a sectional view along a D-D line in FIG. 9.

FIG. 9 is a sectional view along a C-C line in FIG. 7. FIG. 10 is a sectional view along a D-D line in FIG. 9. Each concave portion 237A has a waterdrop shape tapered in a first circumferential direction S1 (counterclockwise viewed from a rear side in the present preferred embodiment) as one direction in the circumferential direction S. The other direction in the circumferential direction S is referred to as a second circumferential direction S2. Each concave portion 237A includes a first region 237B and a second region 237C located downstream of the first region 237B in the first circumferential direction S1. The first region 237B is thicker than the second region 237C viewed from a rear side (see FIG. 9) and is deeper than the second region 237C (see FIG. 10). In each concave portion 237A, a bottom surface on the first region 237B and a bottom surface on the second region 237C are joined smoothly to define an arc surface.

The cam ring 237 is provided with a first projection 237D and a second projection 237E that project outward from an outer circumferential surface thereof in the radial direction R. The first projection 237D and the second projection 237E are spaced at 180 degree in the circumferential direction S. The cam ring 237 is located between the inner flange 245 of the second case 235 and the second clutch plate 248 at the front end (see FIG. 7). The cam ring 237 is supported by the second case 235 through a front portion thereof fitted in the guide groove 245A of the inner flange 245 (see FIG. 8). The cam ring 237 in this state can be pivoted in the circumferential direction S by being guided through the guide groove 245A. A rear surface of the cam ring 237 contacts a front surface of the second clutch plate 248 at the front end.

A position of the cam ring 237 in the circumferential direction S in FIGS. 7 and 9 is referred to as the "release position". When the cam ring 237 is at the release position, the first projection 237D protrudes leftward and the second projection 237E protrudes rightward. At this time, the first region 237B of each concave portion 237A of the cam ring 237 is aligned with one of the concave portions 245B on the inner flange 245 of the second case 235 in the circumferential direction S and is opposed to this concave portions 245B from the rear side (see FIG. 7). The second case 235 is provided with a pin 235C located above the second projection 237E. A biasing member 249 including a coil spring, for example, is hanged on the pin 235C and the second projection 237E to bias the cam ring 237 in the first circumferential direction S1 (upward in FIG. 9).

The ball 238 is a metal sphere, for example. Balls 238 are provided in the number corresponding to the respective numbers of the concave portion 245B and the concave portion 237A. When the cam ring 237 is at the release position (see FIG. 9), each of the balls 238 is fitted between the concave portion 245B and the first region 237B of the concave portion 237A that are opposed, as shown in FIG. 7, and an adjacent first clutch plate 247 and second clutch plate 248 have a clearance therebetween. Thus, the adjacent first clutch plate 247 and second clutch plate 248 do not contact each other. Since the wet oiling brake 231 at this time is in a released state, the front propeller shaft 83 linked to the first clutch plate 247 can be rotated without meeting a resistance from the second clutch plate 248 to transmit the rotational power from the engine 71 to the front wheels 2.

Figure 11:
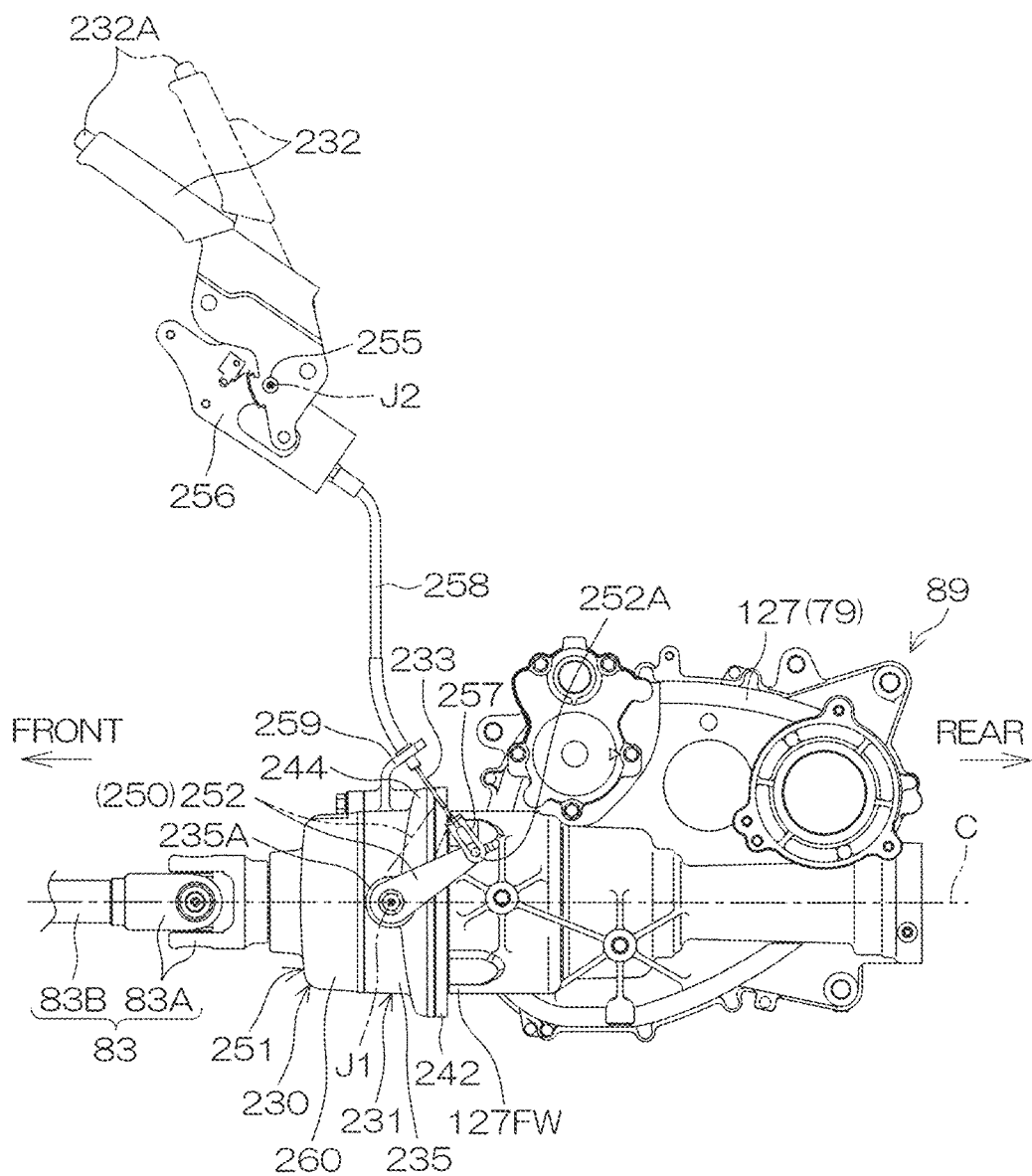
FIG. 11 is a side view of the shiftable transmission and the brake unit.
Figure 12:
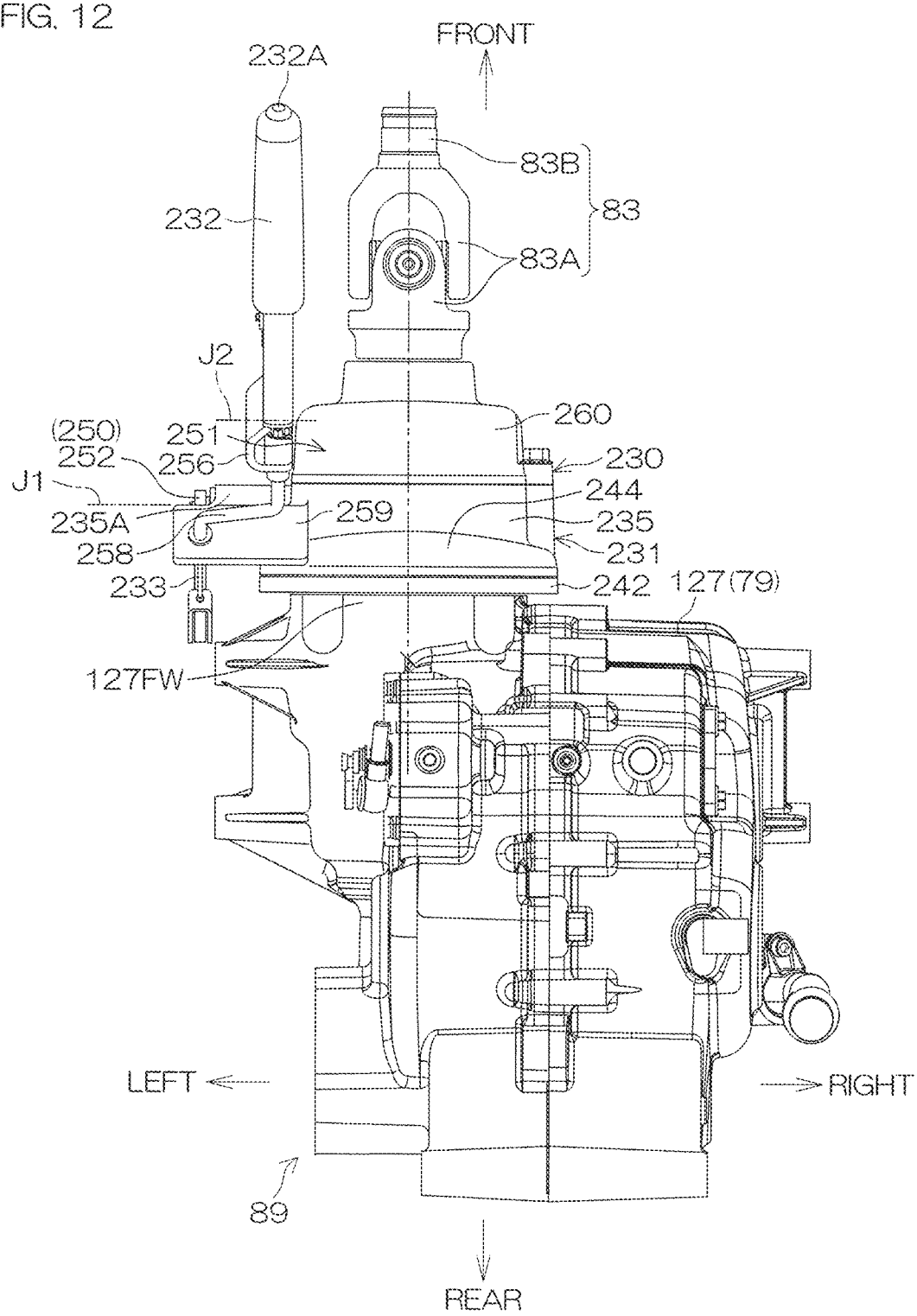
FIG. 12 is a plan view of the shiftable transmission and the brake unit.

FIG. 11 is a left side view of the shiftable transmission 79 and the brake unit 230. FIG. 12 is a plan view of the shiftable transmission 79 and the brake unit 230. The brake lever 250 includes an outer lever 252 located leftward of the projection 235A of the second case 235, an inner lever 253 located in the second case 235, and a linking shaft 254 extending in the right-left direction to link the outer lever 252 and the inner lever 253 (see also FIG. 7). The outer lever 252 and the inner lever 253 each include a root portion that is linked to the linking shaft 254. The outer lever 252 extends rearward and upward from the linking shaft 254. A pin 252A extending leftward is provided on a tip end portion of the outer lever 252. The inner lever 253 extends at least rearward from the linking shaft 254. A tip end portion of the inner lever 253 passes through the opening 245C (see FIG. 8) of the inner flange 245 of the second case 235 to be located in the first inner space 246 and contacts the first projection 237D of the cam ring 237 from underneath (see FIG. 9). The linking shaft 254 is inserted through the through hole 235B of the projection 235A (see FIG. 7). In this state, the brake lever 250 is pivotable around a pivot axis J1 extending in the right-left direction through a center of the linking shaft 254. Since a clearance in the through hole 235B between the projection 235A and the linking shaft 254 is blocked by an oil seal 270, flow of the lubricating oil in the first inner space 246 from this clearance is prevented (see FIG. 7).

The operating lever 232 is arranged in the front-rear direction in a region Q between the pair of front seats 5A in plan view (see FIG. 14 described below). The operating lever 232 is located at the same or generally the same position of the outer lever 252 of the brake lever 250 in the right-left direction and, more specifically, is located slightly rightward of the outer lever 252 (see FIG. 12). A rear portion of the operating lever 232 is connected to a bracket 256 via a support shaft 255 extending in the right-left direction. The bracket 256 is supported by the intermediate frame 4A, for example. The operating lever 232 is pivotable in an up-down direction around a pivot axis J2 extending in the right-left direction through a center of the support shaft 255. Since the pivot axis J1 of the brake lever 250 and the pivot axis J2 of the operating lever 232 both extend in the right-left direction, they are oriented in the same or generally the same direction (see FIG. 12). The pivot axis J2 is located forward and upward of the pivot axis J1.

The wire 233 links the pin 252A at the tip end portion of the outer lever 252 of the brake lever 250 and a rear end portion farther rearward than the support shaft 255 on the operating lever 232. The wire 233 extends rearward and downward from the rear end portion of the operating lever 232 while bending slightly leftward on the midway and then bending slightly rearward (see FIG. 12). A joint 257 including a slot is attached to a rear end portion of the wire 233, and the pin 252A of the outer lever 252 is fitted to this slot. An intermediate portion of the wire 233 is covered by a tube 258. An upper end portion of the tube 258 is fixed to a rear end portion of the bracket 256 supporting the operating lever 232. A lower end portion of the tube 258 is fixed to a bracket 259 extending upward from the second case 235. The wire 233 is slidable to a circumferential surface of the tube 258.

Figure 13:
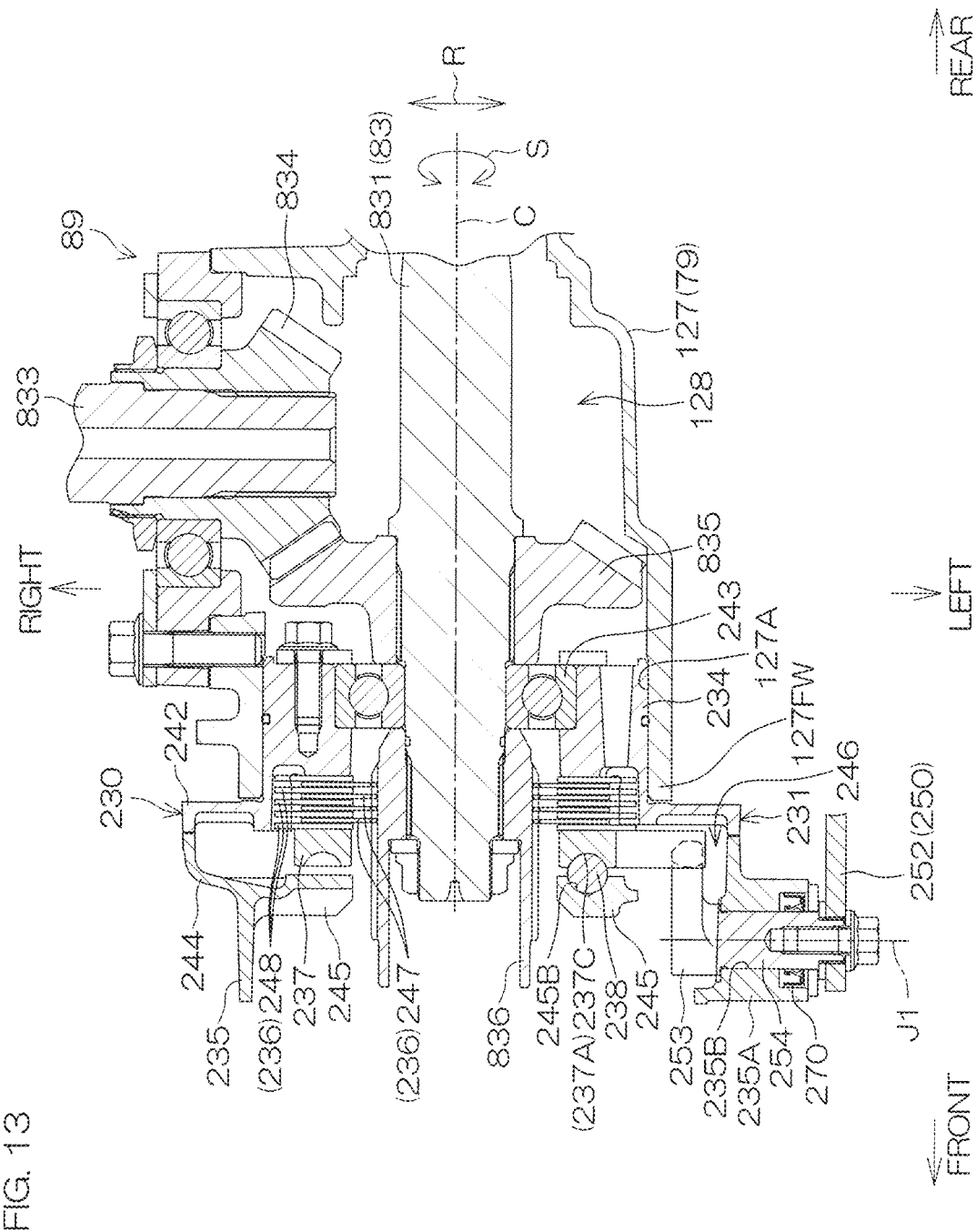
FIG. 13 is a sectional view corresponding to FIG. 7 and showing an operating state of a wet oiling brake of the brake unit.

When an occupant sitting on the left front seat 5AL grabs and pulls up the operating lever 232, the operating lever 232 pivots rearward and upward as shown by a two-dot chain line. In response to this pivot, the rear end portion of the operating lever 232 moves forward to pull the wire 233. In response to this, the brake lever 250 pivots forward and upward as shown by a two-dot chain line. At this time, since the tip end portion of the inner lever 253 pushes up the first projection 237D of the cam ring 237 in the brake lever 250, the cam ring 237 pivots against a biasing force of the biasing member 249 from the release position present thus far to downstream in the second circumferential direction S2 (see FIG. 9). A position of the cam ring 237 after pivot is referred to as a lock position. Due to the pivot of the cam ring 237 to the lock position, each ball 238 moves from the first region 237B thus far to the second region 237C shallower than the first region 237B within a corresponding concave portion 237A in the cam ring 237. Then, as shown in FIG. 13, each ball 238 overreaches from the second region 237C, and in response to this, the cam ring 237 moves rearward to push rearward the second clutch plate 248 at the front end.

Then, a clearance between an adjacent first clutch plates 247 and second clutch plate 248 is removed, the adjacent first clutch plates 247 and second clutch plate 248 contact (specifically are pressure-contacted). Since the wet oiling brake 231 is accordingly operated, the rotation of the front propeller shaft 83 linked to the first clutch plates 247 is braked by being subjected to a frictional resistance between the first clutch plates 247 and the second clutch plate 248. The operating lever 232 is locked by a not-shown lock mechanism at a pulled-up position.

Referring to FIG. 11, when an occupant presses a release button 232A at a front end portion of the operating lever 232, the locking of the operating lever 232 by the lock mechanism described above is released. When the occupant then grabs and presses down the operating lever 232, the operating lever 232 pivots forward and downward as shown by a solid line. The rear end portion of the operating lever 232 pushes rearward the wire 233 while moving rearward in response to this pivot. In response to this, the brake lever 250 pivots rearward and downward as shown by a solid line. At this time, since the tip end portion of the inner lever 253 lowers to stop pushing up the first projection 237D of the cam ring 237 in the brake lever 250, the cam ring 237 pivots to downstream in the first circumferential direction S1 by the biasing force of the biasing member 249 to return to the release position (see FIG. 9). Accordingly, each ball 238 moves from the second region 237C to the first region 237B in a corresponding concave portion 237A in the cam ring 237. Then, as shown in FIG. 7, the cam ring 237 moves forward to stop pushing rearward the second clutch plate 248 at the front end. Then a clearance is made between an adjacent first clutch plate 247 and second clutch plate 248, and the adjacent first clutch plate 247 and second clutch plate 248 are separated to release the wet oiling brake 231.

Referring to FIG. 6, the torque limiter 251 is arranged downstream of the wet oiling brake 231 in the transmission direction of the rotational power from the engine 71 to the front wheels 2. The torque limiter 251 includes a third case 260 defining a portion of a housing thereof and a tube portion 261 arranged around the first portion 831 of the front propeller shaft 83. The torque limiter 251 further includes a second multiple disk clutch 262 located between the tube portion 261 and the second portion 832 of the front propeller shaft 83.

The third case 260 includes a cylindrical small diameter portion 260A surrounding a front portion of the second portion 832, a large diameter portion 260B having a larger diameter than the small diameter portion 260A, and a linking portion 260C linking an intermediate portion of the small diameter portion 260A and a front end of the large diameter portion 260B. A bearing 263 is interposed between a rear portion of an inner circumferential surface of the small diameter portion 260A and the second portion 832. Thus, the second portion 832 is pivotably supported by the third case 260. A rear end of the large diameter portion 260B is coupled to a front end of the second case 235.

The second case 235 and the third case 260 define a third inner space 264 therebetween. The third inner space 264 is surrounded by the second case 235 and the large diameter portion 260B of the third case 260. The third inner space 264 is defined between the inner flange 245 of the second case 235 and the linking portion 260C of the third case 260 in the front-rear direction.

The third inner space 264 is located farther forward than the first inner space 246 of the wet oiling brake 231. The third inner space 264 is communicated with the first inner space 246 via a center opening in the annular inner flange 245. In this state, lubricating oil in the first inner space 246 can flow into the third inner space 264 through the center opening of the annular inner flange 245. Thus, the third inner space 264 contains lubricating oil. The first inner space 246, the second inner space 128 of the shiftable transmission 79, and the third inner space 264 share lubricating oil. An oil surface F of lubricating oil contained in the first inner space 246, the second inner space 128, and the third inner space 264 is at a position higher than respective lower portion of the first multiple disk clutch 236 and the second multiple disk clutch 262. In this case, relatively plenty lubricating oil in the second inner space 128 can be used to lubricate and cool the first multiple disk clutch 236 in the first inner space 246 and the second multiple disk clutch 262 in the third inner space 264. Since a clearance between a front end portion of the small diameter portion 260A of the third case 260 and the second portion 832 of the front propeller shaft 83 is blocked by an oil seal 265, flow of the lubricating oil from this clearance is prevented.

Most of the tube portion 261 is accommodated in the third inner space 264. The tube portion 261 includes a cylindrical small diameter portion 261A surrounding the first portion 831 of the front propeller shaft 83, a large diameter portion 261B located farther forward than the small diameter portion 261A and having a larger diameter than the small diameter portion 261A, and a linking portion 261C linking a front end of the small diameter portion 261A and a rear end of the large diameter portion 261B. A rear end portion of the small diameter portion 261A is located in the first inner space 246 through the center opening of the inner flange 245 of the second case 235. Since the small diameter portion 261A is splined to the support 836 of the first portion 831, the tube portion 261 can be integrally rotated with the support 836, that is, the first portion 831 of the front propeller shaft 83. The large diameter portion 261B surrounds the rear end portion of the second portion 832. An annular flange 261D jutting inward in the radial direction R is provided on a front end portion of an inner circumferential surface of the large diameter portion 261B. The flange 261D can be integrally rotated with the tube portion 261 while in a state of surrounding the rear end portion of the second portion 832 in a contactless manner.

The second multiple disk clutch 262 is accommodated in the third inner space 264 and is located between the linking portion 261C and the flange 261D of the tube portion 261. The second multiple disk clutch 262 includes a toric third clutch plate 266, a toric fourth clutch plate 267, and a toric biasing member 268 adjacently arranged to a rear surface of the flange 261D. In the present preferred embodiment, a plurality of (specifically seven) third clutch plates 266 are aligned in the front-rear direction. An outer circumferential portion of each third clutch plate 266 is splined to the inner circumferential portion of the large diameter portion 261B of the tube portion 261. Therefore, each third clutch plate 266 can be rotated with the tube portion 261, that is, the first portion 831 of the front propeller shaft 83 and is slidable to the tube portion 261 in the front-rear direction.

In the present preferred embodiment, a plurality of (specifically six) fourth clutch plates 267 are located between adjacent third clutch plates 266 one by one. An inner circumferential portion of each fourth clutch plate 267 is splined to an outer circumferential portion of the rear end portion of the second portion 832 of the front propeller shaft 83. Therefore, each fourth clutch plate 267 can be rotated with the second portion 832 and is slidable to the second portion 832 in the front-rear direction.

The biasing member 268 is a leaf spring such as washer, for example, and is compressed between the flange 261D of the tube portion 261 and a third clutch plate 266 at a front end. The biasing member 268 in the compressed state biases rearward the third clutch plate 266 at the front end by trying to recover the original shape. Thus, the third clutch plate 266 and the fourth clutch plate 267 are sandwiched between the linking portion 261C of the tube portion 261 and the biasing member 268, and an adjacent third clutch plate 266 and fourth clutch plate 267 contact (specifically, are pressure-contacted). Therefore, the third clutch plate 266 and the fourth clutch plate 267 can be integrally rotated by a frictional force caused therebetween.

Usually, the rotational power from the engine 71 is transmitted between the wet oiling brake 231 and the front wheels 2 via the third clutch plate 266 and the fourth clutch plate 267 in the contacted state. However, when the rotation of the front wheels 2 is locked while the engine 71 generates a high output, for example, the rotational power of the engine 71 exceeds a predetermined amount. Then the third clutch plate 266 and the fourth clutch plate 267 move forward against a biasing force of the biasing member 268, and further, an adjacent third clutch plate 266 and fourth clutch plate 267 are separated. Thus, transmission of the rotational power equal to or more than the predetermined amount between the wet oiling brake 231 and the front wheels 2 is interrupted. When the rotational power becomes lower than the predetermined amount, an adjacent third clutch plate 266 and fourth clutch plate 267 contact again. Therefore, the transmission of the rotational power between the wet oiling brake 231 and the front wheels 2 is resumed.

Figure 14:
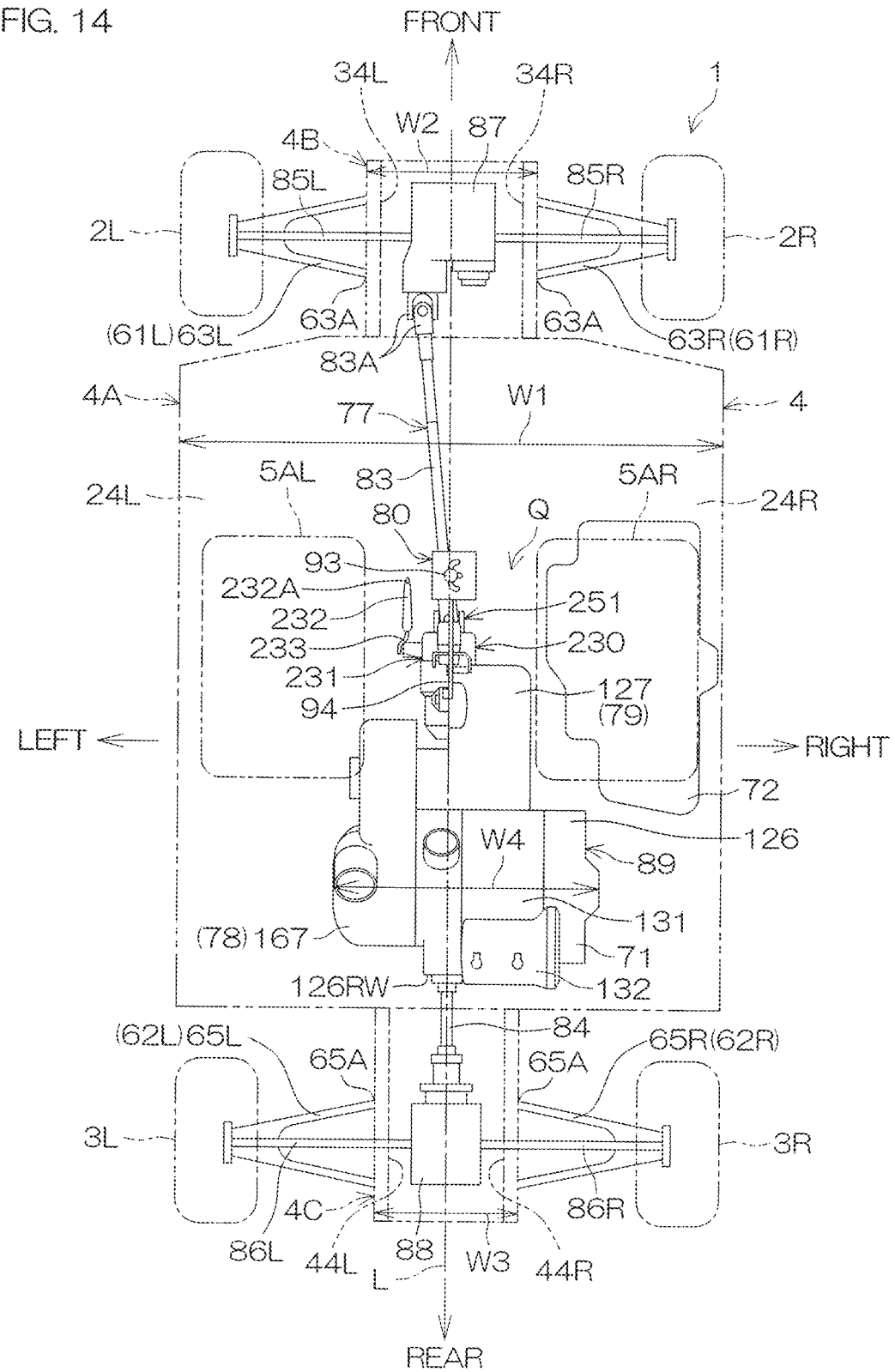
FIG. 14 is a schematic plan view of the vehicle.

FIG. 14 is a schematic plan view of the vehicle 1. The wet oiling brake 231 in the present preferred embodiment is used as a parking brake. Brakes (not shown) that brake rotations of the vehicle wheels by pedal operation, etc., by the driver during travel of the vehicle 1 are provided separately of the wet oiling brake 231. These brakes are provided respectively at the front wheels 2L and 2R and the rear wheels 3L and 3R.

The wet oiling brake 231 is located outside the engine 71 in the front-rear direction and within a region defined by the intermediate frame 4A. Specifically, the wet oiling brake 231 is located at an inner side of an outline of the intermediate frame 4A in plan view. The wet oiling brake 231 is not required to be fixed to the intermediate frame 4A. A width W1 of the intermediate frame 4A defines a right-left distance between a right end of the right plate frame portion 24R and a left end of the left plate frame portion 24L. The lateral frame portions 25 of the right frame 4R and the left frame 4L that are respectively provided at outer sides of the right plate frame portion 24R and the left plate frame portion 24L (see FIG. 4) may be deemed to be portions of the intermediate frame 4A. In that case, the width W1 is a distance between a right end of the lateral frame portion 25 of the right frame 4R and a left end of the lateral frame portion 25 of the left frame 4L. On the other hand, a width W2 of the front frame 4B defines a right-left distance between a right end of the side frame portion 34R and a left end of the side frame portion 34L. A width W3 of the rear frame 4C defines a right-left distance between a right end of the side frame portion 44R and a left end of the side frame portion 44L. The width W1 of the intermediate frame 4A is larger than the width W2 of the front frame 4B and the width W3 of the rear frame 4C. That is, the intermediate frame 4A is wider than the front frame 4B and the rear frame 4C. The width W2 and the width W3 may be the same or may different. A width W4 of the drive unit 89 defines a right-left distance between a right end of the crankcase 126 and a left end of the CVT case 167.

The wet oiling brake 231 is located between the front gearing 87 supported by the front frame 4B, and the rear gearing 88 supported by the rear frame 4C. The wet oiling brake 231 is located at an upstream position closer to the engine 71 than the front gearing 87 and the rear gearing 88 which define and function as final gears. The wet oiling brake 231 is located between rear ends 63A of the front lower arms 63L and 63R and front ends 65A of the rear lower arms 65L and 65R. The wet oiling brake 231 is located farther forward than the drive unit 89. The wet oiling brake 231 is thus located farther forward than the engine 71 and the shiftable transmission 79. The wet oiling brake 231 is located at the center or substantially the center of the vehicle 1 in the right-left direction so as to overlap with the centerline L of the vehicle 1 in plan view. At least a portion of the wet oiling brake 231 is located in a region Q between the pair of front seats 5A in plan view. The wet oiling brake 231 is located farther rearward than front ends of the front seats 5A.

Figure 15:
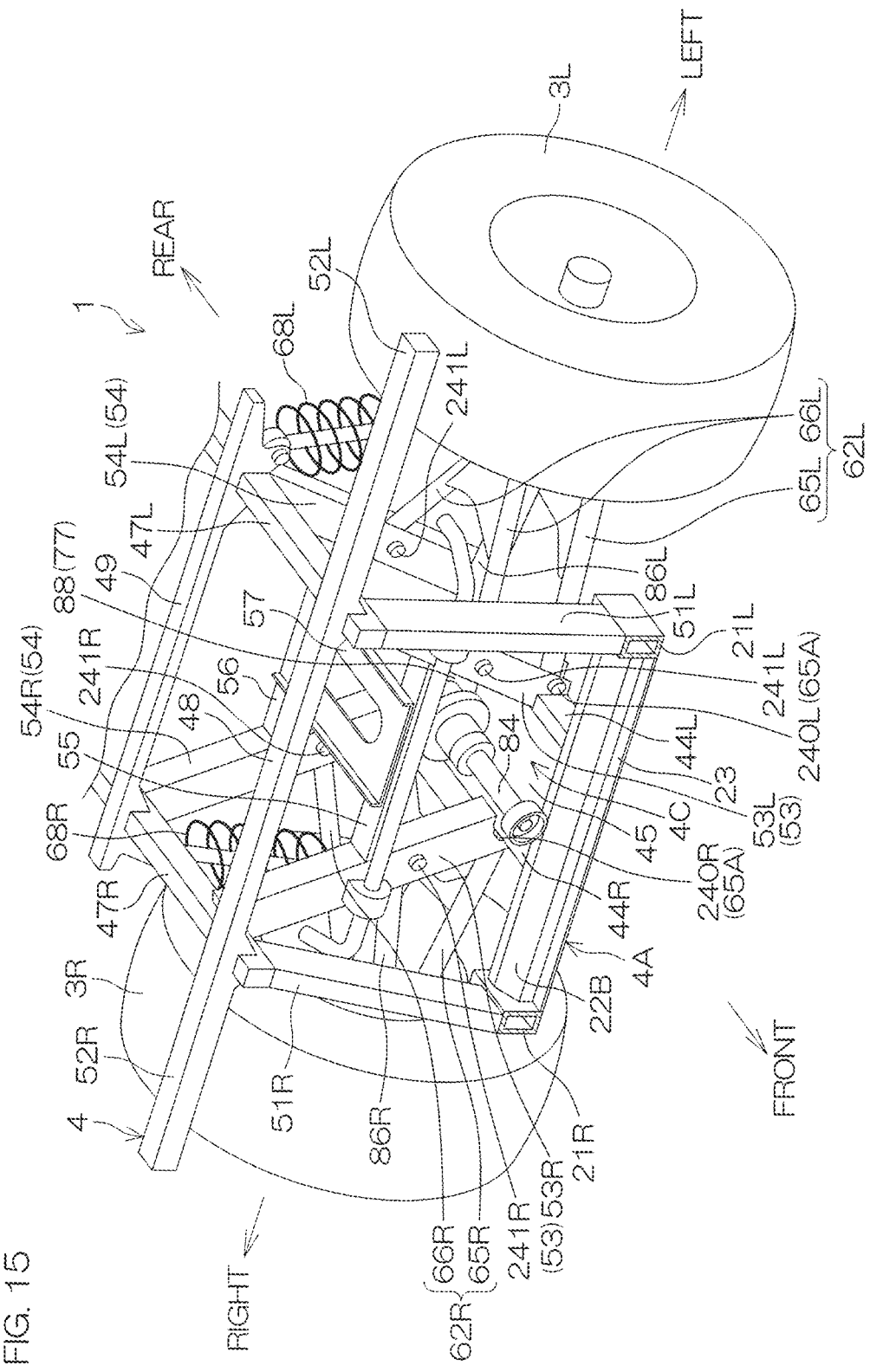
FIG. 15 is a schematic perspective view of a rear frame of the frame and a periphery thereof.

FIG. 15 is a schematic perspective view of the rear frame 4C and a periphery thereof. The pair of front vertical frames 53 extend upward to the right and left from the rear frame 4C. The pair of rear vertical frames 54 also extend upward to the right and left from the rear frame 4C. The front vertical frame 53L of the pair of front vertical frames 53 and the rear vertical frame 54L of the pair of rear vertical frames 54 overlap at least partially when viewed from the front-rear direction. The front vertical frame 53R of the pair of front vertical frames 53 and the rear vertical frame 54R of the pair of rear vertical frames 54 overlap at least partially when viewed from the front-rear direction.

Lower end portions of the front vertical frame 53L and the rear vertical frame 54L define portions of the side frame portion 44L of the rear frame 4C. Lower end portions of the front vertical frame 53R and the rear vertical frame 54R define portions of the side frame portion 44R of the rear frame 4C. A right-left width W5 between respective lower ends of the pair of front vertical frames 53 defines a right-left distance between the side frame portion 44R and the side frame portion 44L (see FIG. 16 to be described below). In the present preferred embodiment, the width W5 is also a right-left distance between respective lower ends of the pair of rear vertical frames 54.

Upper end portions of the front vertical frame 53L and the rear vertical frame 54L define portions of the supporting frame portion 47L of the upper frame 4D. Upper end portions of the front vertical frame 53R and the rear vertical frame 54R define portions of the supporting frame portion 47R of the upper frame 4D. A right-left width W6 between respective upper ends of the pair of front vertical frames 53 defines a right-left distance between the supporting frame portion 47R and the supporting frame portion 47L (see FIG. 16). In the present preferred embodiment, the width W6 is also a right-left distance between respective upper ends of the pair of rear vertical frames 54. The width W5 is preferably not more than about one-third of the width W6, for example. The width W6 is preferably as wide as possible because the laterally long rear deck 60 (see FIG. 2) is linked to the upper end portions of the front vertical frames 53 and the rear vertical frames 54.

The front vertical frame 53L and the rear vertical frame 54L include leftward facing U-shaped or substantially U-shaped planar cross sections. The right end of the rear lower arm 65L is inserted in the lower end portions of the front vertical frame 53L and the rear vertical frame 54L. The right end of the rear lower arm 65L is mounted to the lower end portions of the front vertical frame 53L and the rear vertical frame 54L so as to be swingable up and down via a swing shaft 240L extending in the front-rear direction. A front end surface of the swing shaft 240L exposed from the front vertical frame 53L may be deemed to be the front end 65A of the rear lower arm 65L. The right end of the rear upper arm 66L is inserted in the intermediate portions of the front vertical frame 53L and the rear vertical frame 54L. The right end of the rear upper arm 66L is mounted to the intermediate portions of the front vertical frame 53L and the rear vertical frame 54L so as to be swingable up and down via a swing shaft 241L extending in the front-rear direction.

The front vertical frame 53R and the rear vertical frame 54R include rightward facing U-shaped or substantially U-shaped planar cross sections. The left end of the rear lower arm 65R is inserted in the lower end portions of the front vertical frame 53R and the rear vertical frame 54R. The left end of the rear lower arm 65R is mounted to the lower end portions of the front vertical frame 53R and the rear vertical frame 54R so as to be swingable up and down via a swing shaft 240R extending in the front-rear direction. A front end surface of the swing shaft 240R exposed from the front vertical frame 53R may be deemed to be the front end 65A of the rear lower arm 65R. The left end of the rear upper arm 66R is inserted in the intermediate portions of the front vertical frame 53R and the rear vertical frame 54R. The left end of the rear upper arm 66R is mounted to the intermediate portions of the front vertical frame 53R and the rear vertical frame 54R so as to be swingable up and down via a swing shaft 241R extending in the front-rear direction.

Figure 16:
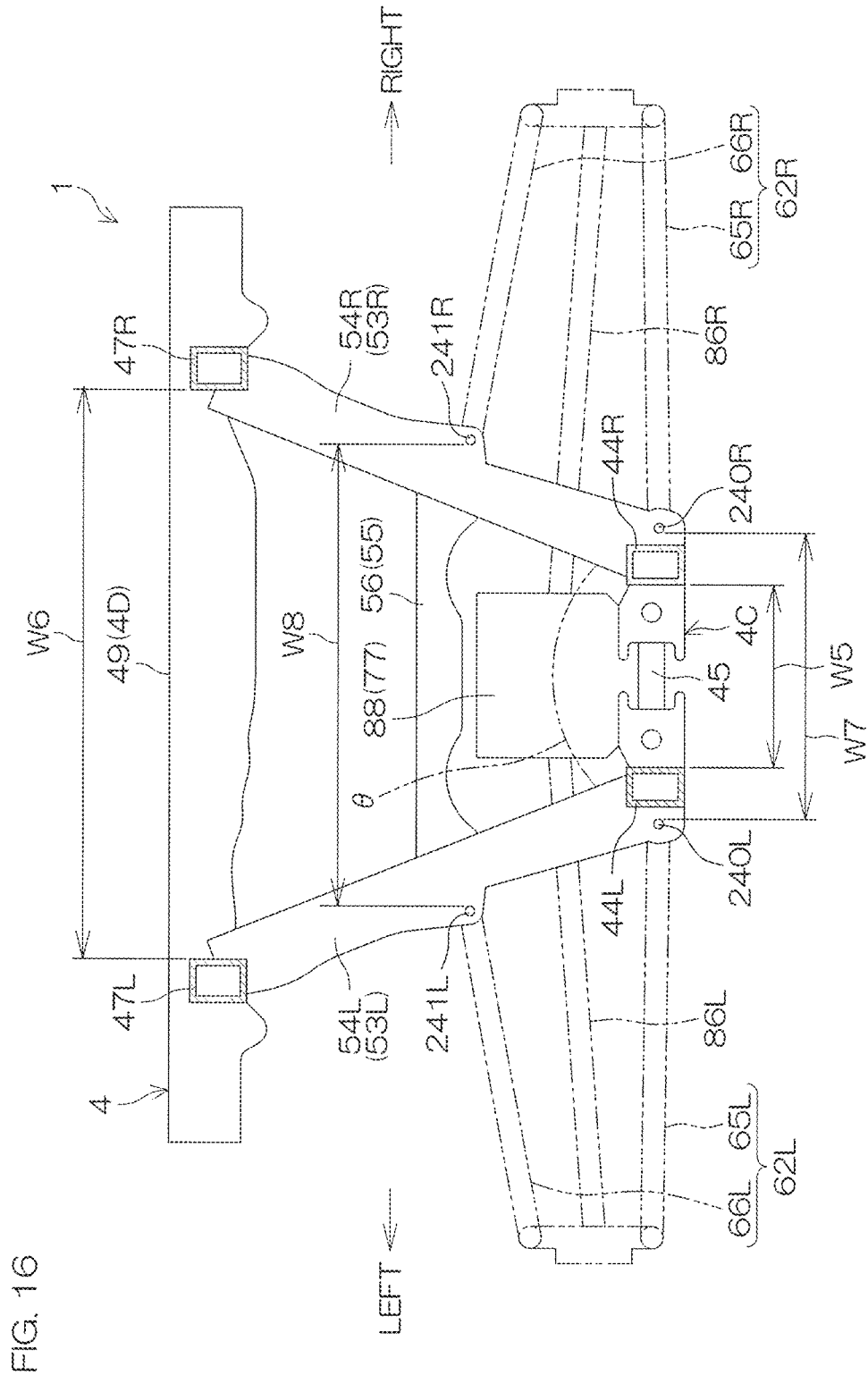
FIG. 16 is a schematic rear view of the rear frame and the periphery thereof.

FIG. 16 is a schematic rear view of the rear frame 4C and the periphery thereof. A mounting width W7 of the pair of rear lower arms 65R and 65L at the rear frame 4C defines a right-left distance between the swing shaft 240R and the swing shaft 240L. A mounting width W8 of the pair of rear upper arms 66R and 66L at the rear vertical frames 54 defines a right-left distance between the swing shaft 241R and the swing shaft 241L. The mounting width W8 also defines a mounting width of the pair of rear upper arms 66R and 66L at the pair of front vertical frames 53. The mounting width W7 is narrower than the mounting width W8 and the width W4 (see FIG. 14) of the drive unit 89. The width W4 and the mounting width W8 may be the same. The mounting width W8 may be wider than or may be narrower than the width W4. The width W5 between the respective lower ends of the pair of front vertical frames 53, the mounting width W7, the mounting width W8, and the width W6 between the respective upper ends of the pair of front vertical frames 53 increase in distance in that order.

As described above, with the structural arrangement according to a preferred embodiment of the present invention, the wet oiling brake 231 that is located outside the engine 71 and includes the first multiple disk clutch 236 is located within the region defined by the intermediate frame 4A in the front-rear direction. An installation space for the wet oiling brake 231 is thus not required to be provided in the front frame 4B or the rear frame 4C. It is thus unnecessary to widen the widths of the front frame 4B and the rear frame 4C to avoid interference with the wet oiling brake 231. The width W2 of the front frame 4B and the width W3 of the rear frame 4C (particularly the distance between the pair of front vertical frames 53 and the distance between the pair of rear vertical frames 54) are thus able to be narrow. Making the vehicle 1 compact at the front frame 4B and the rear frame 4C is thus enabled. Further, the front lower arms 63R and 63L which are mounted to the front frame 4B and support the front wheels 2, and the rear lower arms 65R and 65L which are mounted to the rear frame 4C and support the rear wheels 3 are able to be long in the right-left direction. That is, by disposing the wet oiling brake 231 at a position that would not affect the front lower arms 63R and 63L and the rear lower arms 65R and 65L, securing sufficient lengths of the front lower arms 63R and 63L and the rear lower arms 65R and 65L is enabled while making the vehicle 1 compact.

According to a preferred embodiment of the present invention, the wet oiling brake 231 is located between the front gearing 87 supported by the front frame 4B, and the rear gearing 88 supported by the rear frame 4C. The installation space for the wet oiling brake 231 is thus not required to be provided in the front frame 4B or the rear frame 4C. The width W2 of the front frame 4B and the width W3 of the rear frame 4C are thus able to be narrow. The front lower arms 63R and 63L and the rear lower arms 65R and 65L are thus able to be long in the right-left direction while making the vehicle 1 compact at the front frame 4B and the rear frame 4C.

According to a preferred embodiment of the present invention, the wet oiling brake 231 is located between the rear ends 63A of the front lower arms 63R and 63L mounted to the front frame 4B, and the front ends 65A of the rear lower arms 65R and 65L mounted to the rear frame 4C. In accordance with this preferred embodiment, the installation space for the wet oiling brake 231 is not required to be provided in the front frame 4B or the rear frame 4C. The width W2 of the front frame 4B and the width W3 of the rear frame 4C are thus able to be narrow. The front lower arms 63R and 63L and the rear lower arms 65R and 65L are thus able to be long in the right-left direction while making the vehicle 1 compact at the front frame 4B and the rear frame 4C.

According to a preferred embodiment of the present invention, the wet oiling brake 231 is located farther forward than the engine 71. In accordance with this preferred embodiment, the wet oiling brake 231 is able to be located in proximity to the engine 71 that is supported by the intermediate frame 4A. The installation space for the wet oiling brake 231 is thus not required to be provided in the front frame 4B or the rear frame 4C. The width W2 of the front frame 4B and the width W3 of the rear frame 4C are thus able to be narrow. The front lower arms 63R and 63L and the rear lower arms 65R and 65L are thus able to long in the right-left direction while making the vehicle 1 compact at the front frame 4B and the rear frame 4C.

According to a preferred embodiment of the present invention, the intermediate frame 4A is wider than the front frame 4B and the rear frame 4C. In accordance with this preferred embodiment, the installation space for the wet oiling brake 231 is able to be secured in the wide intermediate frame 4A. The installation space is thus not required to be provided in the front frame 4B or the rear frame 4C. The width W2 of the front frame 4B and the width W3 of the rear frame 4C are thus able to be narrow. The front lower arms 63R and 63L and the rear lower arms 65R and 65L are thus able to be long in the right-left direction while making the vehicle 1 compact at the front frame 4B and the rear frame 4C.

According to a preferred embodiment of the present invention, the wet oiling brake 231 is located downstream of the shiftable transmission 79 in the transmission direction of the rotational power from the engine 71 to the front wheels 2. In accordance with this preferred embodiment, the wet oiling brake 231 to brake the rotation of the propeller shaft can be located farther forward than the shiftable transmission 79 transmitting the rotational power to the front wheels 2 from the engine 71 supported by the intermediate frame 4A. Therefore, when the wet oiling brake 231 is located farther forward than the shiftable transmission 79, the installation space of the wet oiling brake 231 is not required to be provided in the rear frame 4C. The width W3 of the rear frame 4C are thus able to be narrow. The rear lower arms 65L and 65R are thus able to be long while making the vehicle 1 compact at the rear frame 4C.

According to a preferred embodiment of the present invention, the wet oiling brake 231 is located farther forward than the shiftable transmission 79 which is located farther forward than the engine 71 supported by the intermediate frame 4A. The installation space for the wet oiling brake 231 is thus not required to be provided in the rear frame 4C. The width W3 of the rear frame 4C is thus able to be narrow. The rear lower arms 65R and 65L are thus able to be long in the right-left direction while making the vehicle 1 compact at the rear frame 4C.

According to a preferred embodiment of the present invention, the first inner space 246 of the wet oiling brake 231 is communicated with the second inner space 128 in such a manner that the lubricating oil in the second inner space 128 of the shiftable transmission 79 can flow into the first inner space 246. In accordance with this preferred embodiment, the lubricating oil in the second inner space 128 of the shiftable transmission 79 can flow into the first inner space 246 of the wet oiling brake 231 to lubricate and cool the first multiple disk clutch 236 in the first inner space 246 by this lubricating oil. The front lower arms 63L and 63R and the rear lower arms 65R and 65L swingably attached to the frame 4 can thus remain long while using the lubricating oil efficiently and making the vehicle 1 compact.

According to a preferred embodiment of the present invention, the vehicle 1 further includes the torque limiter 251 located downstream of the wet oiling brake 231 in the transmission direction of the rotational power from the engine 71 to the front wheels 2. The torque limiter 251 interrupts transmission of a rotational power equal to or more than a predetermined amount between the wet oiling brake 231 and the front wheels 2. In accordance with this preferred embodiment, since a rotational power equal to or more than a predetermined amount is not transmitted between the wet oiling brake 231 and the front wheels 2 by the torque limiter 251, it can be prevented that an overload due to this rotational power is applied to the transmission 77 (for example, the front gearing 87) between the wet oiling brake 231 and the front wheels 2.

According to a preferred embodiment of the present invention, at the front propeller shaft 83, the rotation of the first portion 831 is braked by contact between the first clutch plate 247 and the second clutch plate 248 in the wet oiling brake 231. At the front propeller shaft 83, the first portion 831 and the second portion 832 are linked by contact between the third clutch plate and the fourth clutch plate in the second multiple disk clutch 262 of the torque limiter 251. Thus, transmission of a rotational power between the wet oiling brake 231 and the front wheels 2 is made possible. On the other hand, at the torque limiter 251, transmission of a rotational power equal to or more than a predetermined amount between the wet oiling brake 231 and the front wheels 2 can be interrupted by separation between the third clutch plate and the fourth clutch plate.

Further, the third inner space 264 of the torque limiter 251 is communicated with the first inner space 246 in such a manner that the lubricating oil in the first inner space 246 of the wet oiling brake 231 can flow into the third inner space 264. Thus, the lubricating oil in the first inner space 246 can flow into the third inner space 264 to lubricate and cool the second multiple disk clutch 262 in the third inner space 264 by this lubricating oil. The arms swingably attached to the frame to support the wheels can thus remain long while making the vehicle 1 compact and using the lubricating oil efficiently.

According to a preferred embodiment of the present invention, the lubricating oil is shared in the first inner space 246, the second inner space 128, and the third inner space 264. In accordance with this preferred embodiment, the first multiple disk clutch 236 in the first inner space 246, structures such as the output shaft 833 in the second inner space 128 of the shiftable transmission 79, and the second multiple disk clutch 262 in the third inner space 264 can be lubricated and cooled by the common lubricating oil. The front lower arms 63L and 63R and the rear lower arms 65R and 65L swingably attached to the frame 4 can thus remain long while making the vehicle 1 compact and using the lubricating oil efficiently.

According to a preferred embodiment of the present invention, at least a portion of the wet oiling brake 231 is located in the region Q between a pair of seats 5 in plan view. In accordance with this preferred embodiment, the wet oiling brake 231 is able to be located at the center or substantially the center of the vehicle 1 in the right-left direction, thus enabling the center of gravity of the vehicle 1 to be close to the center of the vehicle in the right-left direction and improving motion performance of the vehicle 1.

According to a preferred embodiment of the present invention, when an occupant seated on either of the pair of seats 5 pivots the operating lever 232 between these seats 5, an operational power thereof is transmitted to the brake lever 250 via the wire 233 to pivot the brake lever 250. Since the first clutch plate 247 and the second clutch plate 248 are contacted or separated in response to the pivot of the brake lever 250, the wet oiling brake 231 is operated or released.

When the pivot axis J1 of the operating lever 232 and the pivot axis J2 of the brake lever 250 are oriented so as to be orthogonalized to each other in plan view, for example, the wire 233 is required to be greatly detoured in order to link the brake lever 250 and the operating lever 232. This makes the wire 233 long. However, in accordance with this preferred embodiment, the pivot axis J2 of the brake lever 250 and the pivot axis J1 of the operating lever 232 are oriented in the same or generally the same direction in plan view. Accordingly, the wire 233 can link the brake lever 250 and the operating lever 232 without being greatly detoured. This can make the wire 233 short. The front lower arms 63L and 63R and the rear lower arms 65L and 65R swingably attached to the frame 4 can thus remain long while making the vehicle 1 compact and shortening the wire 233.

Although preferred embodiments of the present invention have been described above, the present invention is not restricted to the contents of these preferred embodiments and various modifications are possible within the scope of the present invention.

In accordance with the above-described preferred embodiment of the present invention, while the brake unit 230 includes the torque limiter 251, the torque limiter 251 may be omitted.

The wet oiling brake 231 may be located farther rearward than the engine 71 and brake the rotation of the rear propeller shaft 84. In this case, the rear propeller shaft 84 is configured in the same manner as described above about the front propeller shaft 83. According to this, the wet oiling brake 231 is arranged downstream of the shiftable transmission 79 in the transmission direction of the rotational power from the engine 71 to the rear wheels 3. A torque limiter 251 may be provided to interrupt transmission of a rotational power equal to or more than a predetermined amount between the wet oiling brake 231 and the rear wheels 3. In this case, the torque limiter 251 is arranged downstream of the wet oiling brake 231 in the transmission direction of the rotational power from the engine 71 to the rear wheels 3. When the wet oiling brake 231 is located farther rearward than the shiftable transmission 79 in such a manner, an installation space of the wet oiling brake 231 is not required to be provided in the front frame 4B. The width W2 of the front frame 4B is thus able to be narrow. The front lower arms 63L and 63R are thus able to be long while making the vehicle 1 compact at the front frame 4B.

The wet oiling brake 231 may be used not just as the parking brake for parking, but also used as a brake for deceleration of the vehicle 1 during traveling.

Although two seats 5 are preferably aligned in the right-left direction, three or more seats 5 may be aligned in the right-left direction.

The vehicle 1 preferably includes the pair of front wheels 2L and 2R and the pair of rear wheels 3L and 3R. However, a vehicle according to a preferred embodiment of the present invention may include two or more pairs of front wheels 2 and may include two or more pairs of rear wheels 3.

Although the vehicle 1 is preferably a recreational off-road vehicle, the vehicle according to a preferred embodiment of the present invention may be a utility vehicle of any category. A general utility vehicle includes a frame structure and vehicle wheels suited for off-road travel.

Also, features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   at least one seat located such that a plurality of occupants are able to be seated in a right-left direction of the vehicle;
   an engine;
   a front frame including a pair of right and left front arms swingably mounted thereto and respectively supporting right and left front wheels;
   a rear frame including a pair of right and left rear arms swingably mounted thereto and respectively supporting right and left rear wheels;
   an intermediate frame located between the front frame and the rear frame in a front-rear direction of the vehicle and supporting the at least one seat and the engine;
   a front propeller shaft extending forward from the engine to transmit a rotational power of the engine to the front wheels;
   a rear propeller shaft extending rearward from the engine to transmit the rotational power of the engine to the rear wheels;
   a wet oiling brake including a first multiple disk clutch including a first clutch plate rotated with the front propeller shaft or the rear propeller shaft and a second clutch plate fixed with respect to a position in a rotating direction of the first clutch plate, and a first inner space accommodating the first multiple disk clutch and lubricating oil, located within a region defined by the intermediate frame in the front-rear direction to brake a rotation of the front propeller shaft or the rear propeller shaft by contact between the first clutch plate and the second clutch plate;
   a shiftable transmission that shifts and transmits the rotational power from the engine to the front propeller shaft and the rear propeller shaft; wherein
   the wet oiling brake is located downstream of the shiftable transmission in a transmission direction of the rotational power from the engine to the front wheels or the rear wheels; and
   the shiftable transmission is located farther forward than the engine and the wet oiling brake is located farther forward than the shiftable transmission.

2. The vehicle according to claim 1, further comprising:
   a front drive shaft extending in the right-left direction and linked to the front wheels;
   a rear drive shaft extending in the right-left direction and linked to the rear wheels;
   a front gearing supported by the front frame and linking the front propeller shaft and the front drive shaft; and
   a rear gearing supported by the rear frame and linking the rear propeller shaft and the rear drive shaft; wherein
   the wet oiling brake is located between the front gearing and the rear gearing.

3. The vehicle according to claim 1, wherein the wet oiling brake is located between rear ends of the pair of front arms and front ends of the pair of rear arms.

4. The vehicle according to claim 1, wherein the intermediate frame is wider than the front frame and the rear frame.

5. A vehicle comprising:
   at least one seat located such that a plurality of occupants are able to be seated in a right-left direction of the vehicle;
   an engine;
   a front frame including a pair of right and left front arms swingably mounted thereto and respectively supporting right and left front wheels;
   a rear frame including a pair of right and left rear arms swingably mounted thereto and respectively supporting right and left rear wheels;
   an intermediate frame located between the front frame and the rear frame in a front-rear direction of the vehicle and supporting the at least one seat and the engine;
   a front propeller shaft extending forward from the engine to transmit a rotational power of the engine to the front wheels;
   a rear propeller shaft extending rearward from the engine to transmit the rotational power of the engine to the rear wheels;
   a wet oiling brake including a first multiple disk clutch including a first clutch plate rotated with the front propeller shaft or the rear propeller shaft and a second clutch plate fixed with respect to a position in a rotating direction of the first clutch plate, and a first inner space accommodating the first multiple disk clutch and lubricating oil, located within a region defined by the intermediate frame in the front-rear direction to brake a rotation of the front propeller shaft or the rear propeller shaft by contact between the first clutch plate and the second clutch plate;

a shiftable transmission that shifts and transmits the rotational power from the engine to the front propeller shaft and the rear propeller shaft; wherein the wet oiling brake is located downstream of the shiftable transmission in a transmission direction of the rotational power from the engine to the front wheels or the rear wheels;

the shiftable transmission includes a second inner space containing lubricating oil; and the first inner space is communicated with the second inner space such that the lubricating oil in the second inner space is able to flow into the first inner space.

6. The vehicle according to claim 5, further comprising a torque limiter downstream of the wet oiling brake in the transmission direction of the rotational power from the engine to the front wheels or the rear wheels and interrupts transmit of a rotational power equal to or more than a predetermined amount between the wet oiling brake and the front wheels or the rear wheels.

7. The vehicle according to claim 6, wherein the front propeller shaft or the rear propeller shaft is separated into a first portion rotated with the first clutch plate and a second portion being relatively rotatable to the first portion;

the torque limiter includes a second multiple disk clutch including a third clutch plate rotated with the first portion and a fourth clutch plate that can contact and separate from the third clutch plate and is rotated with the second portion, and a third inner space accommodating the second multiple disk clutch and lubricating oil; and the third inner space is communicated with the first inner space such that the lubricating oil in the first inner space is able to flow into the third inner space.

8. The vehicle according to claim 7, wherein lubricating oil is shared in the first inner space, the second inner space, and the third inner space.

9. A vehicle comprising:

at least one seat located such that a plurality of occupants are able to be seated in a right-left direction of the vehicle;

an engine;

a front frame including a pair of right and left front arms swingably mounted thereto and respectively supporting right and left front wheels;

a rear frame including a pair of right and left rear arms swingably mounted thereto and respectively supporting right and left rear wheels;

an intermediate frame located between the front frame and the rear frame in a front-rear direction of the vehicle and supporting the at least one seat and the engine;

a front propeller shaft extending forward from the engine to transmit a rotational power of the engine to the front wheels;

a rear propeller shaft extending rearward from the engine to transmit the rotational power of the engine to the rear wheels; and a wet oiling brake including a first multiple disk clutch including a first clutch plate rotated with the front propeller shaft or the rear propeller shaft and a second clutch plate fixed with respect to a position in a rotating direction of the first clutch plate, and a first inner space accommodating the first multiple disk clutch and lubricating oil, located within a region defined by the intermediate frame in the front-rear direction to brake a rotation of the front propeller shaft or the rear propeller shaft by contact between the first clutch plate and the second clutch plate; wherein the seat includes a pair of seats aligned in the right-left direction; and at least a portion of the wet oiling brake is located in a region between the pair of seats in a plan view of the vehicle.

10. The vehicle according to claim 9, further comprising:

a brake lever pivotable to contact and separate the first clutch plate and the second clutch plate;

an operating lever pivotable by an occupant sitting on the seat to operate or release the wet oiling brake; and a wire linking the brake lever and the operating lever; wherein a pivot axis of the brake lever and a pivot axis of the operating lever are oriented in a same or generally a same direction; and the operating lever is located in a region between the pair of seats in a plan view.

11. The vehicle according to claim 9, further comprising:

a front drive shaft extending in the right-left direction and linked to the front wheels;

a rear drive shaft extending in the right-left direction and linked to the rear wheels;

a front gearing supported by the front frame and linking the front propeller shaft and the front drive shaft; and a rear gearing supported by the rear frame and linking the rear propeller shaft and the rear drive shaft; wherein the wet oiling brake is located between the front gearing and the rear gearing.

12. The vehicle according to claim 9, wherein the wet oiling brake is located between rear ends of the pair of front arms and front ends of the pair of rear arms.

13. The vehicle according to claim 9, wherein the wet oiling brake is located farther forward or farther rearward than the engine.

14. The vehicle according to claim 9, wherein the intermediate frame is wider than the front frame and the rear frame.

15. The vehicle according to claim 9, further comprising:

a shiftable transmission that shifts and transmits the rotational power from the engine to the front propeller shaft and the rear propeller shaft; wherein the wet oiling brake is located downstream of the shiftable transmission in a transmission direction of the rotational power from the engine to the front wheels or the rear wheels.

16. The vehicle according to claim 15, wherein the shiftable transmission is located farther forward than the engine and the wet oiling brake is located farther forward than the shiftable transmission.

17. The vehicle according to claim 15, wherein the shiftable transmission includes a second inner space containing lubricating oil; and the first inner space is communicated with the second inner space such that the lubricating oil in the second inner space is able to flow into the first inner space.

18. The vehicle according to claim 17, further comprising a torque limiter downstream of the wet oiling brake in the transmission direction of the rotational power from the engine to the front wheels or the rear wheels and interrupts transmit of a rotational power equal to or more than a predetermined amount between the wet oiling brake and the front wheels or the rear wheels.

19. The vehicle according to claim 18, wherein
the front propeller shaft or the rear propeller shaft is separated into a first portion rotated with the first clutch plate and a second portion being relatively rotatable to the first portion;
the torque limiter includes a second multiple disk clutch including a third clutch plate rotated with the first portion and a fourth clutch plate that can contact and separate from the third clutch plate and is rotated with the second portion, and a third inner space accommodating the second multiple disk clutch and lubricating oil; and
the third inner space is communicated with the first inner space such that the lubricating oil in the first inner space is able to flow into the third inner space.

20. The vehicle according to claim 19, wherein lubricating oil is shared in the first inner space, the second inner space, and the third inner space.

\* \* \* \* \*